US 6,545,265 B1

(12) United States Patent
Czarnetzki et al.

(10) Patent No.: US 6,545,265 B1
(45) Date of Patent: Apr. 8, 2003

(54) SYSTEM AND METHOD FOR THE MICROSCOPIC GENERATION OF OBJECT IMAGES

(75) Inventors: Norbert Czarnetzki, Jena (DE); Peter Muehlig, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/463,722

(22) PCT Filed: May 5, 1999

(86) PCT No.: PCT/EP99/03069

§ 371 (c)(1),
(2), (4) Date: Apr. 14, 2000

(87) PCT Pub. No.: WO99/63381

PCT Pub. Date: Dec. 9, 1999

(30) Foreign Application Priority Data

May 30, 1998 (DE) .......................... 198 24 460

(51) Int. Cl.[7] .................................................. H01J 3/14
(52) U.S. Cl. ....................................... 250/234; 359/368
(58) Field of Search ............................... 250/234–236, 250/486.1; 359/368

(56) References Cited

U.S. PATENT DOCUMENTS 5,283,433 A    2/1994    Tsien

FOREIGN PATENT DOCUMENTS

| DE | 196 27 568 | 1/1998 |
|---|---|---|
| WO | 97/31282 | 8/1997 |
| WO | 98/28655 | 7/1998 |

OTHER PUBLICATIONS

English Abstract of DE 196 27 568.
XP–002115491/Optica Acta, 1984, vol. 31, No. 4, (pp. 453–465) "Difference confocal scanning microscopy" T. Wilson, et al.

*Primary Examiner*—Stephone B. Allen
(74) *Attorney, Agent, or Firm*—Reed Smith LLP

(57) ABSTRACT

A method is disclosed for mixing pairs of confocal images and different arrangements for fast generation of parallel confocal images and the combination thereof in real time. The method is used for improving contrast and resolution in confocal images. The suggested arrangements point to some possibilities for a meaningful application of the method for image mixing in parallel confocal single-beam or double-beam methods for the generation of highly resolved images in real time for a wide variety of different applications, especially also for material inspection. By combining at least two confocal images, a resolution of the fine structure of the object is achieved in the mixed image. Contrast, lateral resolution and depth resolution are improved in the mixed image of the object to be examined, which can also be a phase object. Further, the method permits the generation of very highly resolved three-dimensional digital images of optical objects to be examined.

46 Claims, 19 Drawing Sheets

Confocal image 1 (BM1)

Confocal image 2 (BM2)

SEE FIG.2(B)

F I G. 2(A)

Mixed image (MBM)

F I G. 2(B)

Section 1 Rhombic basic arrangement
(detail: right-hand rhombic pinhole array)

Section 2 Rhombic basic arrangement
(detail: altered rhombic pinhole array)

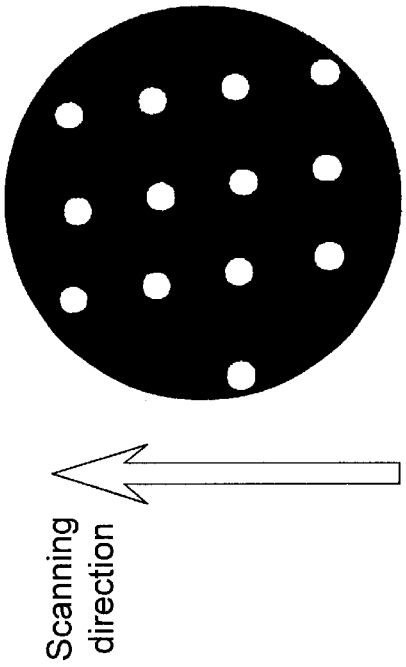
FIG. 5c Right-hand rhombic basic arrangement (detail right-hand rhombic pinhole array 1)
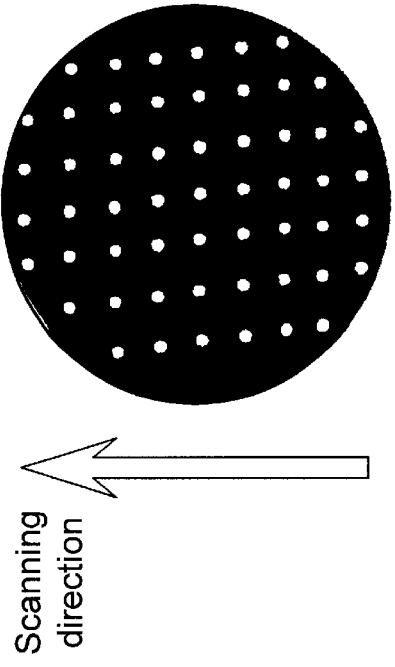
FIG. 5d Right-hand rhombic basic arrangement (detail right-hand rhombic pinhole array 2)
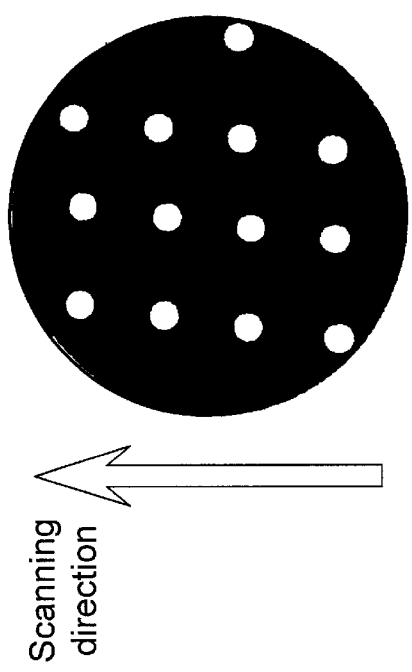
FIG. 5a Left-hand rhombic basic arrangement (detail right-hand rhombic pinhole array 1)
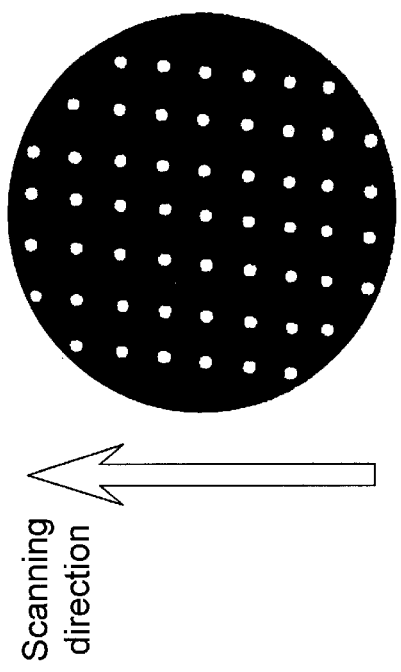
FIG. 5b Left-hand rhombic basic arrangement (detail right-hand rhombic pinhole array 2)

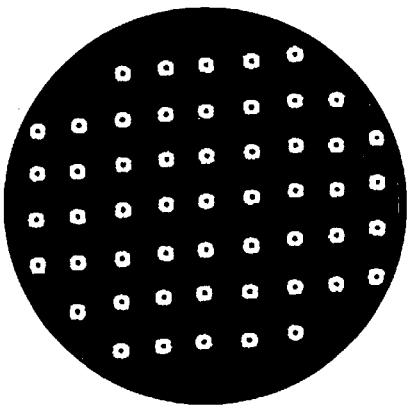
Right-side rhombic basic arrangement
(detail circular pinhole type 1)
FIG. 6c
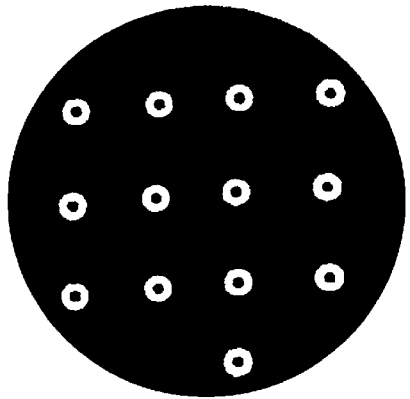
Right-side rhombic basic arrangement
(detail circular pinhole type 2)
FIG. 6d
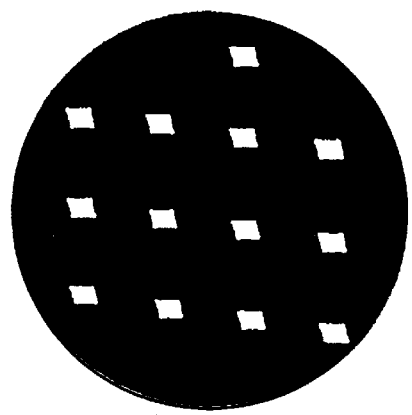
Left-side rhombic basic arrangement
(detail rhombus-shaped pinhole type 1)
FIG. 6a
Left-side rhombic basic arrangement
(detail rhombus-shaped pinhole type 2)
FIG. 6b

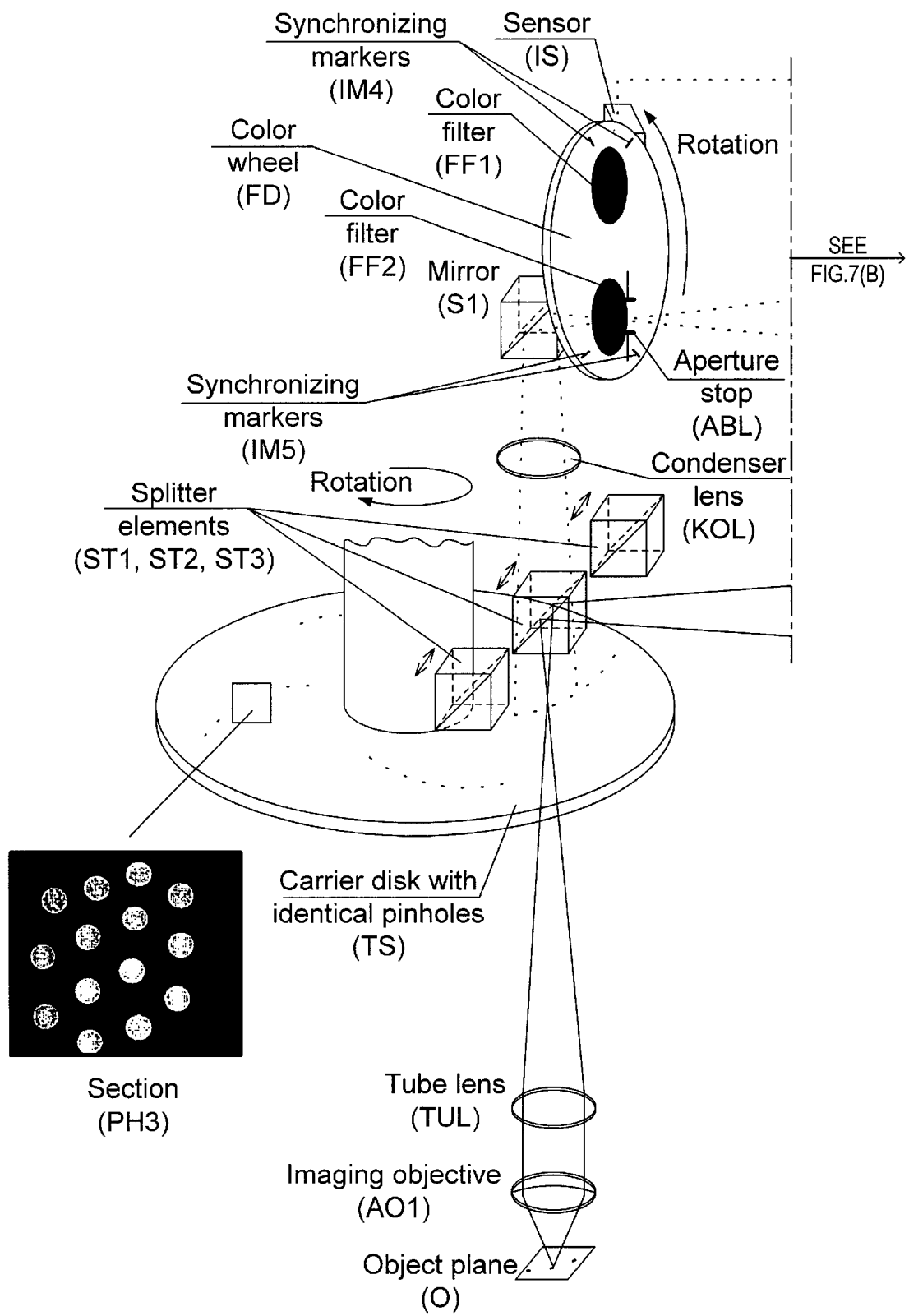
F I G. 7(A)

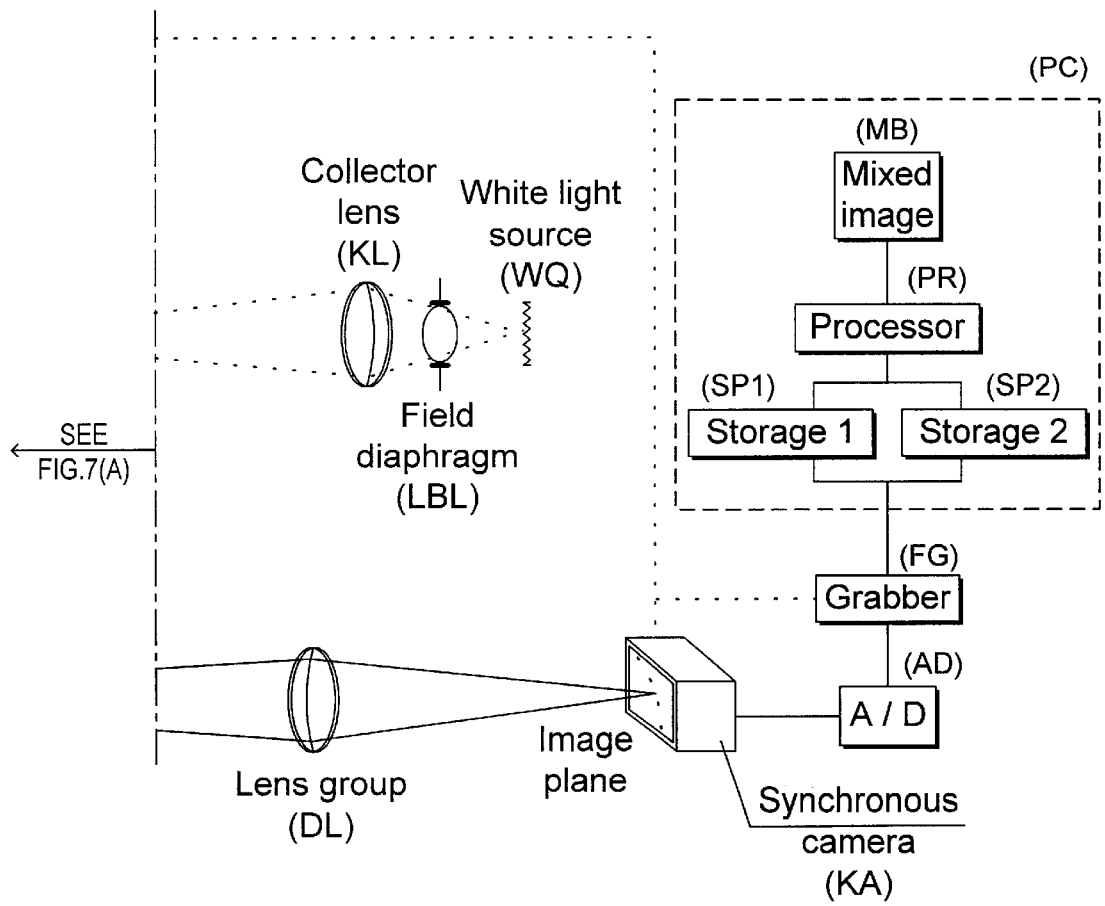
F I G. 7(B)

Spiral structure from Nipkow disk
(detail pinhole type 1 as square rings)

Spiral structure from Nipkow disk
(detail pinhole type 21 as square rings)

Spiral structure from Nipkow disk
(detail hexagonal pinhole type 1)

Spiral structure from Nipkow disk
(detail hexagonal pinhole type 2)

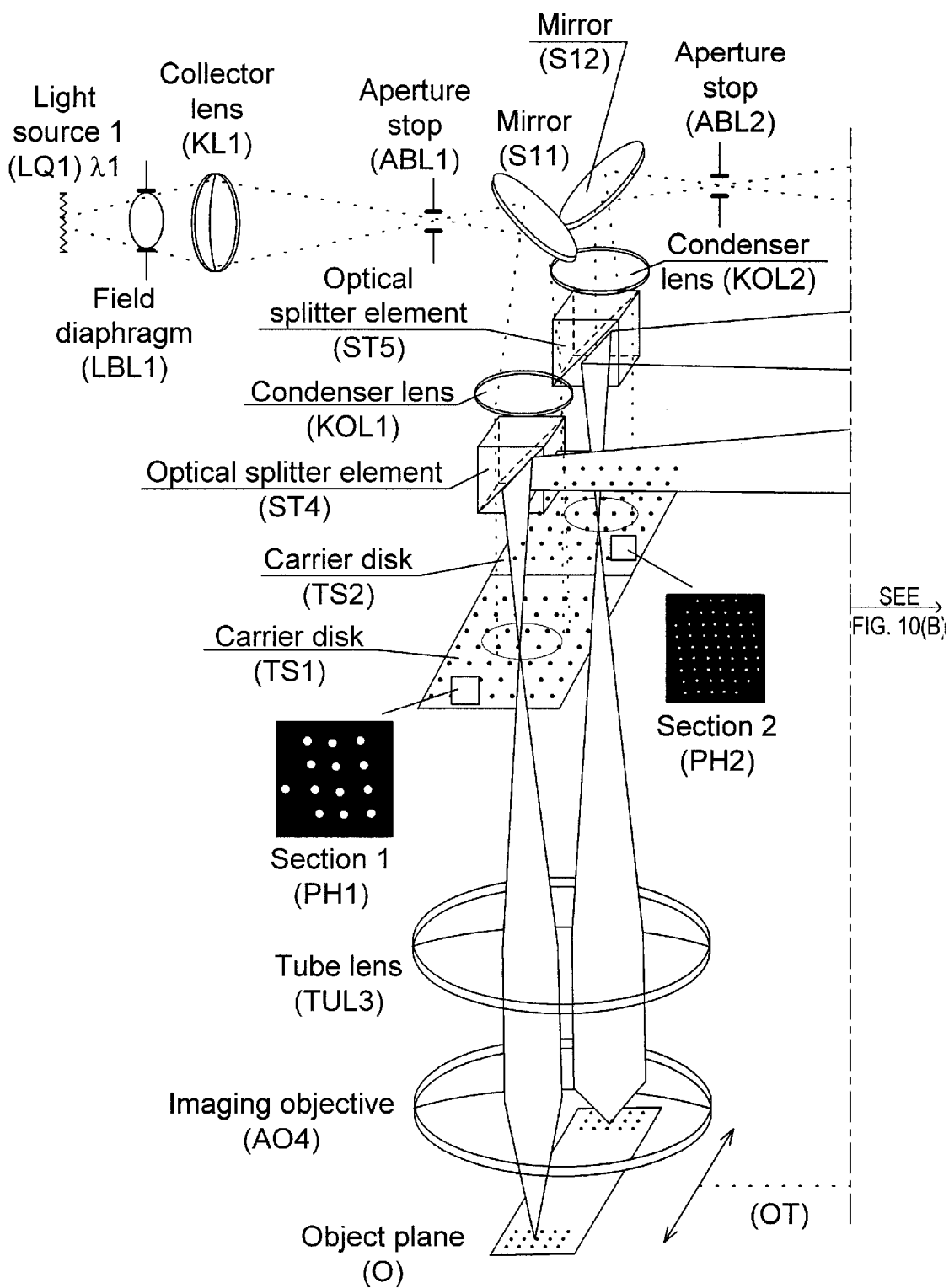
F I G. 10(A)

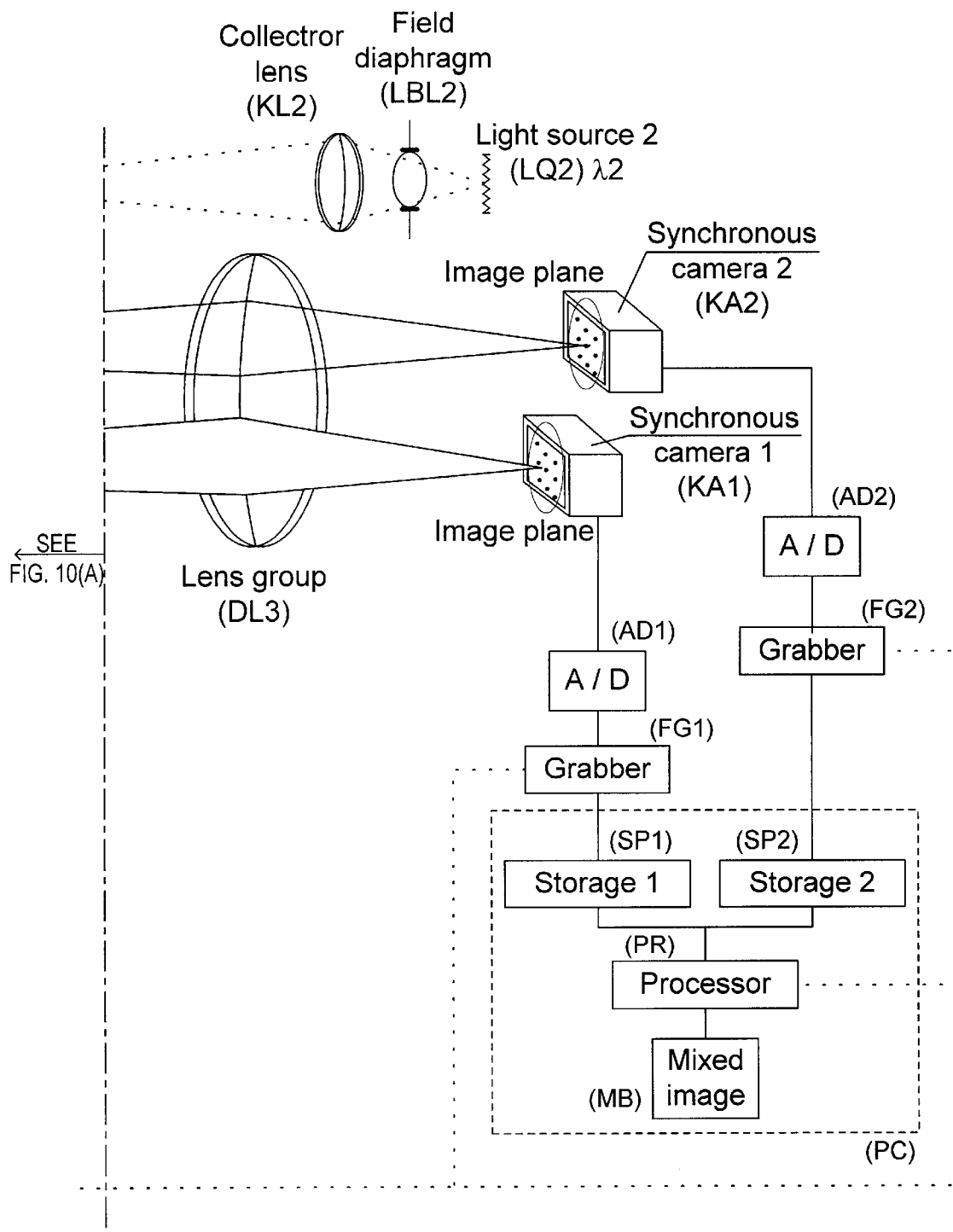
F I G. 10(B)

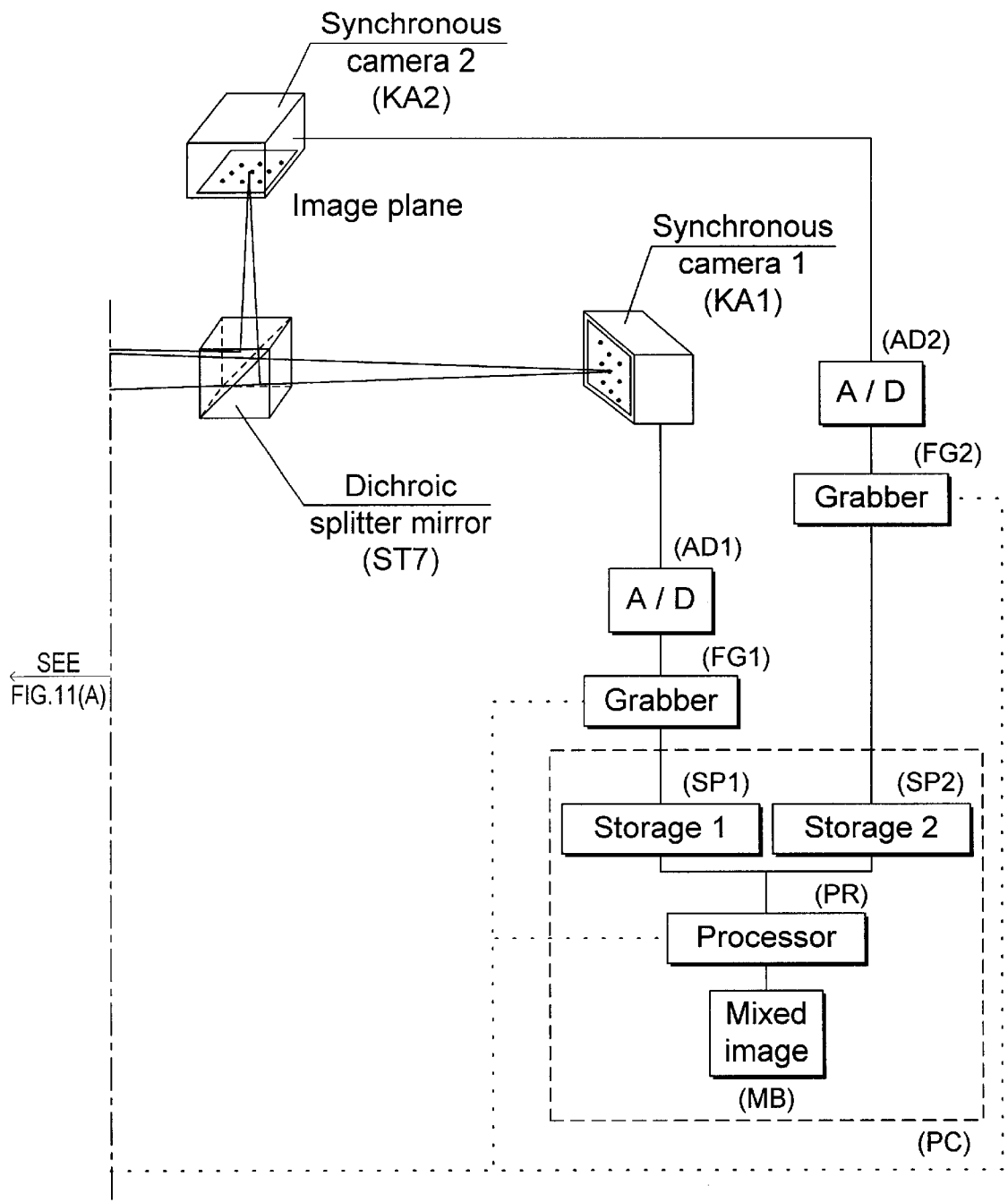
F I G. 11(B)

SYSTEM AND METHOD FOR THE MICROSCOPIC GENERATION OF OBJECT IMAGES

BACKGROUND OF THE INVENTION

Field of the Invention

The invention relates to an arrangement and method for generating object images in a microscope. In particular, a method for mixing pairs of confocal images and different arrangements for fast generation of parallel confocal images and the combination thereof in real time. The method is used for improving contrast and resolution in confocal images. The suggested arrangements point to some possibilities for a meaningful application of the method for image mixing in parallel confocal single-beam or double-beam methods for the generation of highly resolved images in real time for a wide variety of different applications, especially also for material inspection. By combining at least two confocal images, a resolution of the fine structure of the object is achieved in the mixed image. Contrast, lateral resolution and depth resolution are improved in the mixed image of the object to be examined, which can also be a phase object. Further, the method permits the generation of very highly resolved three-dimensional digital images of optical objects to be examined.

Description of the Related Art

The following references may be pertinent to the present invention:

| Patents | | | |
|---|---|---|---|
| DE | 4023650 A1 | 7/25/1990 | Dodt |
| DE | P 40 35 799.6 | 11/10/1990 | Groβkopf, et al. |
| WO | 92/01965 | 7/8/1992 | Wijnaendts |
| DE | 4429416 A1 | 8/19/1994 | Velzel, et al. |
| DE | 19511937 C2 | 3/31/1995 | Schoppe |
| DE | 19529546 A1 | 8/11/1995 | Kapitza |
| DE | 19627568 A1 | 7/9/1996 | Czarnetzki |
| DE | 19632594 A1 | 8/13/1996 | Schwider |
| | 19714221.4 | 2/12/1997 | Ott, et al. |
| WO | 97/31282 | 8/28/1997 | Wilson, et al. |
| US | 5264912 | | |
| US | 5365084 | | |

Literature

"Image Formation in the Scanning Microscope," C. J. R. Sheppard, A. Choudhury; Optica Acta, 1977, Vol. 24, No. 10, pages 1051–1073.

BRIEF DESCRIPTION

Aside from confocal laser scanning microscopes which often only permit a very complicated and lengthy building of the image, arrangements have become established, above all, for scanning an object plane under examination by means of Nipkow disks, or various scanning pinhole arrays (DE P 4035799.6, DE 19627568 A1, 19714221.4) have been suggested for generating confocal images. In addition to typical incident or reflected light arrangements, transmitted light arrangements have also been suggested (DE 4023650 A1) which have not yet been realized technologically. All of these forms of scanner with confocal bundles operating simultaneously (in parallel) have the advantage of fast confocal image formation in real time for high-contrast observation with the naked eye as well as with a camera (WO 92/01965). In this last cited patent, the camera is used as a surface receiver with confocal features through sensitivity control of surface elements; however, the complete image is built very slowly by the required joining together of partial images. Generally, the disadvantages of parallel confocal single-disk scanners are the poor illumination efficiency (low percentage) and limited confocality due to crosstalk effects of the parallel channels. Improvements in the illumination efficiency were achieved in fluorescence applications through the use of combinations of micro-optic components with coincident pinhole arrays (EP 0539691 A2, DE 19627568 A1).

Parallel confocal arrangements have the problem of a highly illuminated image background which is caused by reflections or scattering at the pinhole disk and which can easily cover up the actual image content. In order to reduce the disruptive scattered light influence of an individual Nipkow disk, Xiao and Kino, et al., 1987, suggested an inclined disk with a directed-reflection disk surface whose illumination reflections and back-reflections were masked in a controlled manner. The steps for eliminating interfering light were supplemented in DE 19511937 C2 by optical wedges and rhombic cut splitter elements above a Nipkow disk and therefore by a more thorough elimination of destructive light components in the image bundle. Some of the disturbances of the confocal effect in the main beam path which occur as a result of added elements can be accepted in many applications, but not often in the use of confocal microscopes in applications demanding very high quality, e.g., in microbiology or inspection technology. An enormous improvement in the suppression of false light was achieved by physically separating the confocal elements in illumination from those in confocal observation. Unfortunately, the resulting use of two confocal arrays also caused an intensified sensitivity in the production of the necessary exact conjugation (19714221.4).

In WO 97/31282, a form of masking correction is carried out in confocal images in that a bright-field image is combined with a confocal image by joint exposure on a camera and subsequent subtraction with a pure bright-field image of the same object section. This results in a brighter image on the camera, which, among other things, is supposed to compensate for general deficiencies in illumination of the confocal image to nonconfocal microscope images.

U.S. Pat. No. 5,365,084 describes an arrangement for examining a running strip of web with a TDI sensor for light detection. The use of a CCD array or a TDI sensor for wafer inspection is provided in U.S. Pat. No. 5,264,912.

OBJECT AND SUMMARY OF THE INVENTION

The primary object of the invention is to increase contrast and resolution of confocally recorded images. This object is met in an arrangement for generating object images in a microscope, comprising means for recording at least two confocal images of the same object with distinguishable optical object information with respect to image pixels and for storing them one after the other, and means for combining the recorded and digitized images in a pixel-exact manner, and for storing the mixed image formed in this way.

The object of the invention is to further improve the contrast and resolution of confocal images with the possibility of fast three-dimensional imaging of transparent objects or surfaces having vertical structure by applying an image mixing method accomplished by means of combining different confocal images of an object section and representing them electronically (in real time). The description relates to the method for mixing confocal images and to different arrangements for fast generation of parallel confocal images and suitable combination thereof in quasi-real time. However, the mixing method is also applicable to any form of confocal images which can image exactly the same object section, e.g., also suitably generated images from laser scanning microscopes. However, within the framework of the present description, parallel confocal embodiment forms are discussed mainly.

Parallel confocal illumination rasters and imaging rasters for fast generation of confocal, electronic images with complete image information are generated and stored for the subsequent image combination using different scanning principles. The total image is built very quickly through the parallel-acting generation of confocal image points in the partial beam paths. The speed of the image composition offers favorable base conditions for the decoupling of thermal or mechanical disturbances (vibrations) during the building of the image. It also offers the possibility of generating a quasi-real time image which also permits process examinations in or on the object under examination. Due to the efficiency of the image formation and the advantageous depth discrimination of the special confocal principle, 3-D images can also be generated and can supply new object information especially with transparent objects (phase objects).

The invention will be described more fully in the following with reference to the schematic drawings.

BRIEF DESCRIPTION OF THE DRAWINGS

FIGS. 2A and 2B are a schematic representation of the image point correlations in the image mixing process;

FIG. 5 shows variants of the rhombic arrangement on strip scanners for a confocal image mixing method;

FIG. 6 shows additional variants for generalized pinhole elements;

FIGS. 7A and 7B show an arrangement for a parallel confocal image mixing process with a Nipkow disk and two illumination wavelengths;

FIGS. 10A and 10B show an arrangement for a parallel confocal image mixing method as a construction with monobundle and linear scanning principle; and FIGS. 11A and 11B show an arrangement for a parallel confocal image mixing method with two lasers for illumination as single-beam construction with two TDI cameras using the linear scanning principle.

DESCRIPTION OF THE PREFERRED EMBODIMENT

Figure 1A:
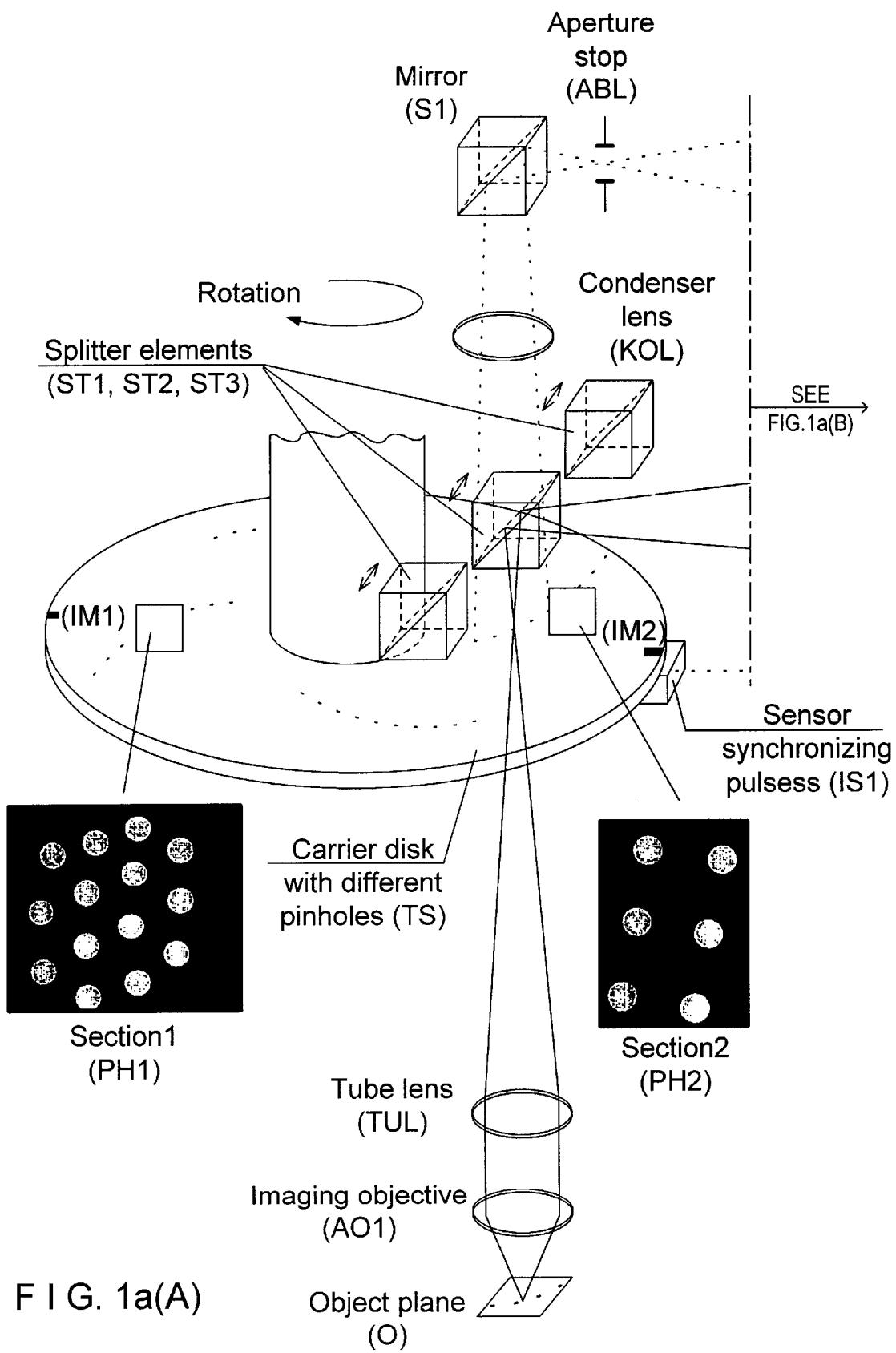
FIGS. 1a(A) and 1a(B) show an arrangement for a parallel confocal image mixing process with a modified Nipkow disk.

In FIG. 1a, a white light source WQ, field diaphragm LBL, collector lens KL, aperture stop ABL, mirror S1, condenser lens KOL, exchangeable dichroic beam splitters ST1, ST2, ST3, and a carrier disk TS with different ring sectors with pinhole arrays PH1, PH2 are arranged successively in the illumination beam path. A pulse sensor IS detects the passage of pulse markers IM1, IM2 which are arranged on the carrier disk TS and which are allocated to the ring sectors.

The illumination of the object O in the object plane is carried out by tube lens TUL and imaging objective AO1. The light coming from object O passes via a selectable beam splitter ST and magnifying detector optics DL, arriving at a camera KA which can be a CCD matrix camera. The analog-to-digital converter AD, frame grabber FG, storage SP1, SP2, and processor PR, which can be component parts of a computer PC in which the mixed image MB originates, are necessary electronic and software components which are arranged successively in a typical manner for such a process.

The first main version of a scanner for the image mixing process is a modified Nipkow-type pinhole disk. In a first variant, different ring sectors with various pinholes or perforated elements which can be selected as squares, rhombuses or ring elements such as perforated rings, square rings or the like are structured on the Nipkow disk with suitable spiral patterns which have different element sizes and spacing in the ring sectors of the rotating disk. The pinhole elements or the entire structure of the ring sectors as well as the synchronizing and timing tracks are produced by a microlithography structuring process, for example. Because of the rotating movement of the Nipkow disk, there is a cycling or periodic recurrence of different ring sectors of the disk in the radiant field/intermediate image plane. They are marked at their start and at their end by synchronizing markers outside the pinhole zone and are read by an electronic auxiliary sensor during the rotation of the pinhole disk and are used in turn as a synchronizing signal.

The individual markers differ from one another, for example, as single markers and double markers, in order to ensure an unambiguous readout of the disk position.

The entire arrangement for realizing the image mixing process with this modified Nipkow scanner will be described in the following with reference to FIG. 1a. The basic optical arrangement comprises a microscope with the modified Nipkow disk as confocal element. An incoherent conventional light source is used for illumination. One or, depending on the application, more exchangeable splitter elements for dividing the illumination beam path from the imaging beam path are formed either as neutral splitters, dichroic splitters or as polarizing splitters. The Nipkow disk rotates vertical to the optical axis at the height of the intermediate image plane in the microscope. A secondary image of the object under observation is generated on the receiver KA by the after-magnifying detector optics DL. The rate of rotation of the modified Nipkow disk should be capable of regulation in order to be able to adapt to the intensity ratios of different observation objects during exposure of the receiver. The modified Nipkow disk causes a confocal image type 1 to originate in ring sector PH 1 and, after further rotation of the disk, causes a confocal image type 2 to be formed in ring sector PH2. Both image types are again recorded one after the other with respect to time by the surface receiver KA and distinguishably digitized by an A-D-converter arranged downstream.

Figure 1A:
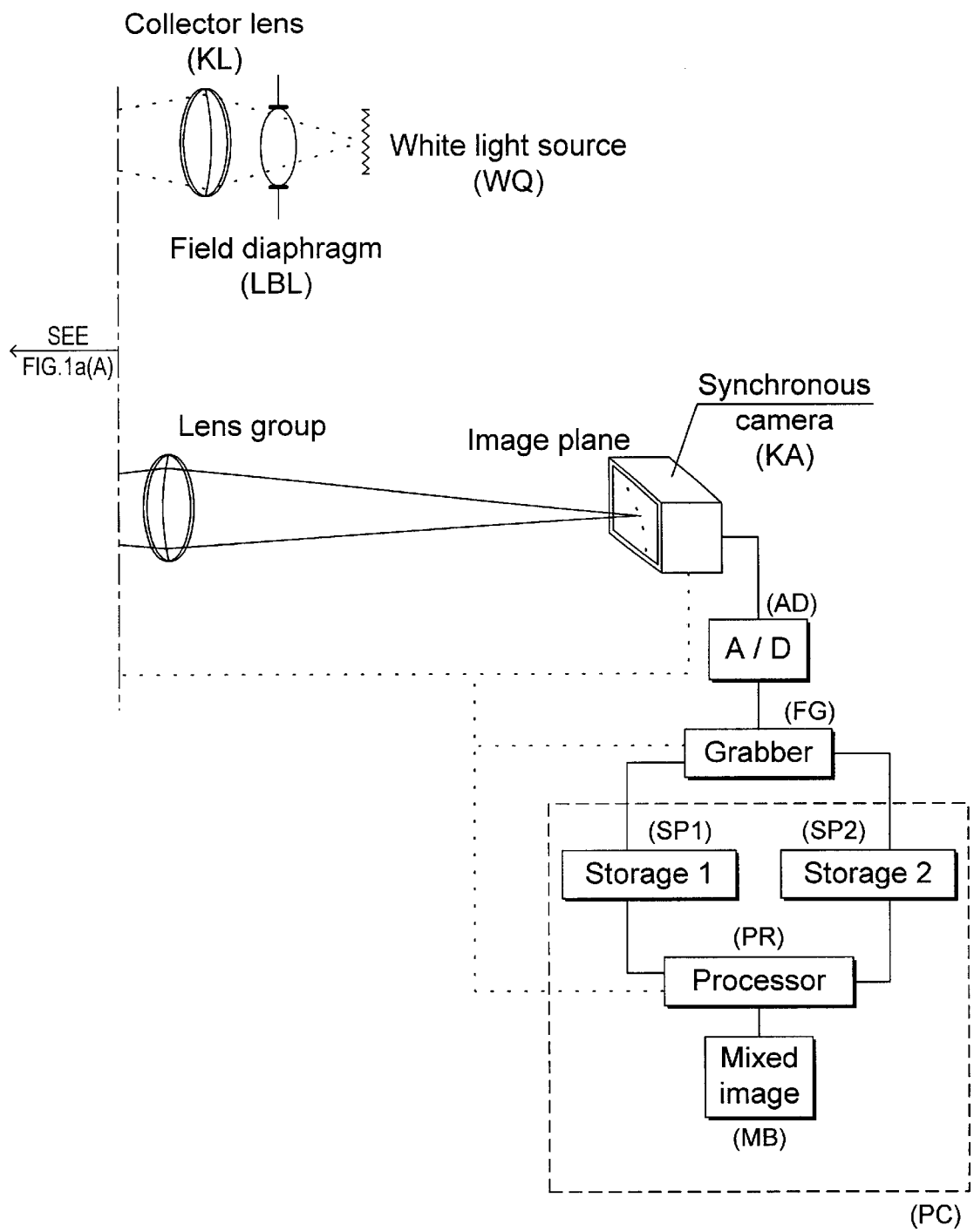
Figure 1B:
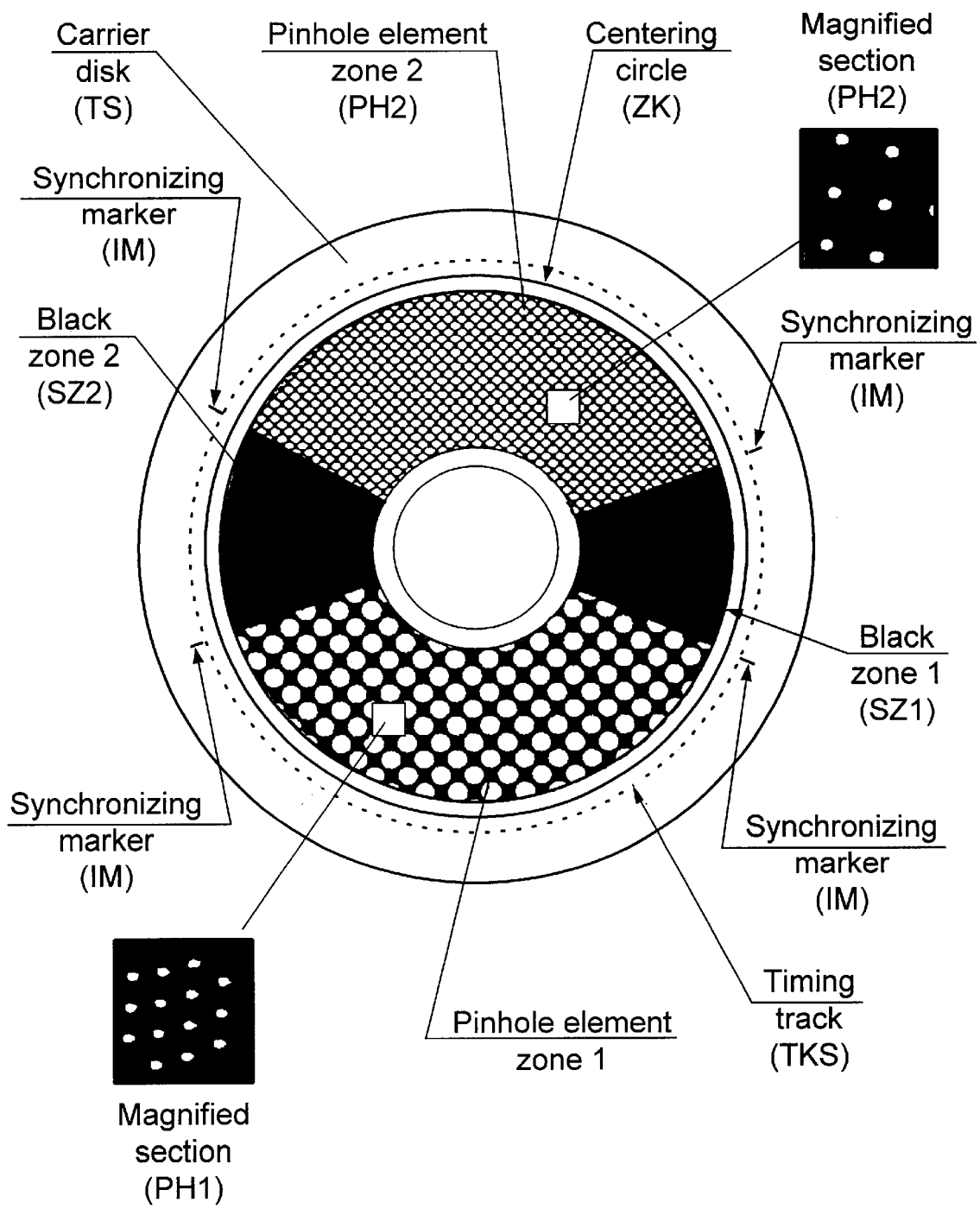
FIG. 1b shows a modified Nipkow disk for parallel confocal image mixing methods.

FIG. 1b shows the basic construction of the modified Nipkow disk and the pinhole structure schematically as well as its sector configuration. The carrier disk TS in FIG. 1b is provided with pulse markers IM on a timing track TKS and with different pinhole zones PH1, PH2, black zones SZ1, SZ2 and a centering circle ZK. The modified Nipkow disk is therefore formed of two ring sectors with different, generalized pinhole elements—separated by dark regions—with a spiral-shaped basic arrangement of the pinholes relative to one another in order to achieve the confocal scan of the entire object surface (in the radiant field/intermediate image plane) through the rotating movement of the Nipkow disk. Each of the pinhole elements of a ring sector has the same character (geometry, pinhole area) and average distance from one another; the coverage with the pinhole area should preferably be identical in the two ring sectors. Corresponding to the actual spiral structure, an image is completely scanned after a certain rotational angle of the Nipkow disk, wherein a multiple quantity of scanning processes of an object region should take place per ring sector to prevent defects during the scan (wobbling of disk, eccentric running of the disk) by averaging the occurring optical image sequences, among others. The spiral pattern can be arranged so as to rotate in the clockwise or counterclockwise direction; the disk can always rotate in any direction desired. The black sectors SZ1, SZ2 serve to divide the ring sectors and to cancel (zero setting of the camera) the preceding image.

The process for improving confocal images includes the combining of at least two or more confocal images of an identical observation object or an identical object section. For practical conversion, the confocal images to be mixed are optically generated in very quick succession one after the other and then combined electronically in a picture point-exact manner. By picture point-exact is meant, for example, for each individual pixel of a CCD camera or TDI camera. The operations for combining aim at an improvement in the quality and resolution of the mixed image. There is an improvement in contrast, lateral and depth resolution in the mixed image as a reproduction and information carrier of the real object to be examined. This is achieved by means of picture point-oriented combination operations such as displacement operations, multiplicative or differential operators of and with the image pixels or pixel information originating from the receiver. The most important and essential combination operations $\Delta(P_{ij})$ of the image pixel matrices is the subtractive operation with the confocal image pair which is defined mathematically by the following formula:

$$\Delta(P_{i'j'}) \equiv P_{i''j''} = P_{ij} - P_{i'j'} \quad (1)$$

$P_{i''j''}$ resultant elements of the image matrix after combination $P_{ij}$ pixel elements of confocal image matrix 1

$P_{i'j'}$ pixel elements of confocal image matrix 2

Figure 2A:
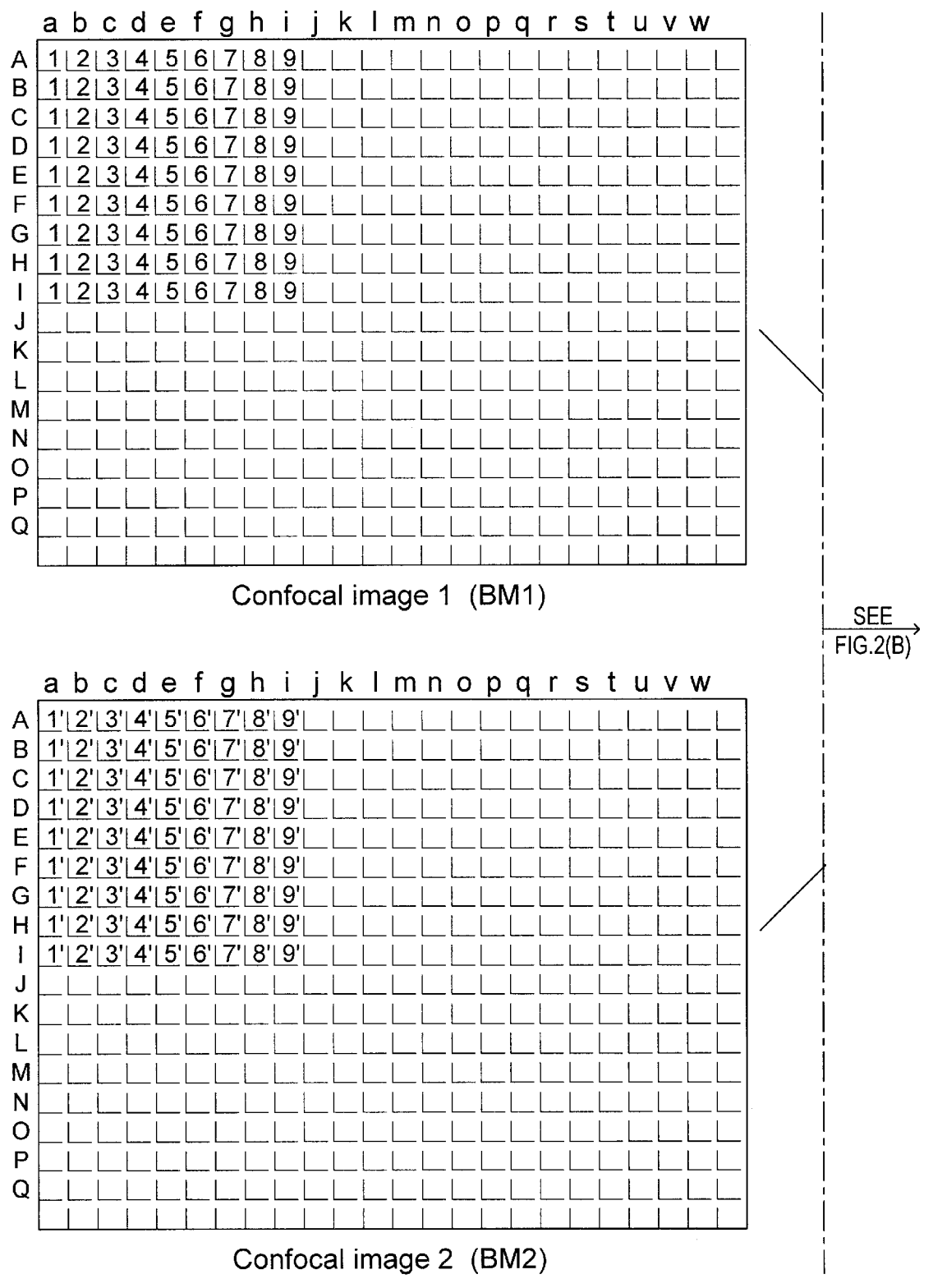
Figure 2B:
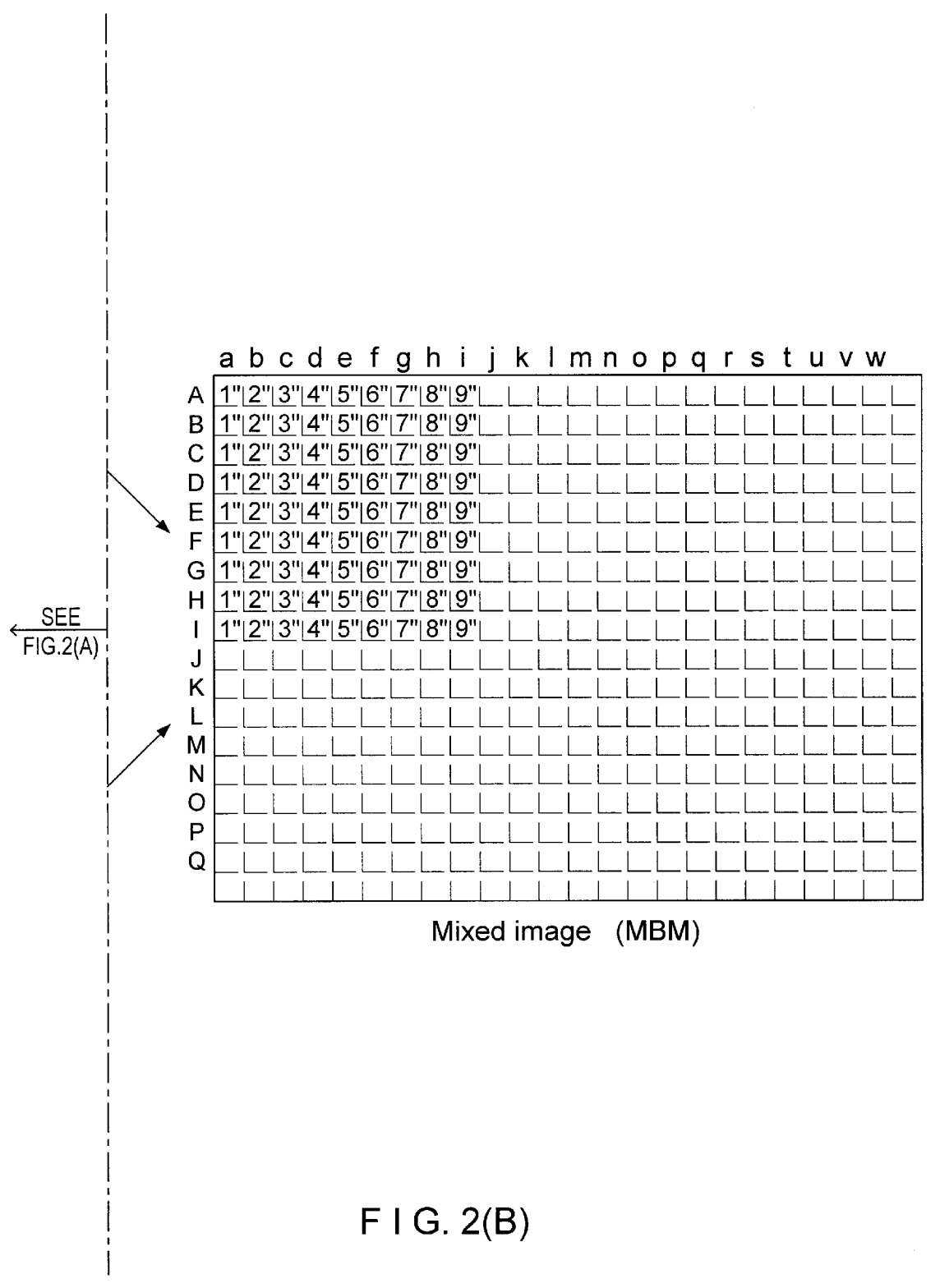

The basic procedure will be illustrated by way of example of 9×9 pixel elements of the image matrices in FIG. 2. FIG. 2 shows the two recorded image pixel matrices BM1, BM2 which are stored in SP1, SP2 and the mixed image matrix MBM which is formed by the above signal processing and stored. With an exact spatial agreement between the object regions in the two confocal initial images with different confocal resolution, the necessarily digitized image pixels can be formed immediately mathematically by subtraction of the correlated line elements (identical uppercase letters) and column elements (identical lowercase letters) of the image matrices. Exact spatial agreement means that the imaging conditions and the object position do not change during the successive recordings, which can be achieved in particular by known steps such as vibration damping. The method can be applied for confocal reflected light images as well as confocal fluorescence images, but, of course, with very different results in the possible final resolution in the mixed image, since the interaction between the confocal optic sensing probe and the object to be imaged in fluorescence applications contains no scatter components, but rather is determined by the self-luminous character of the object.

Figure 3A:
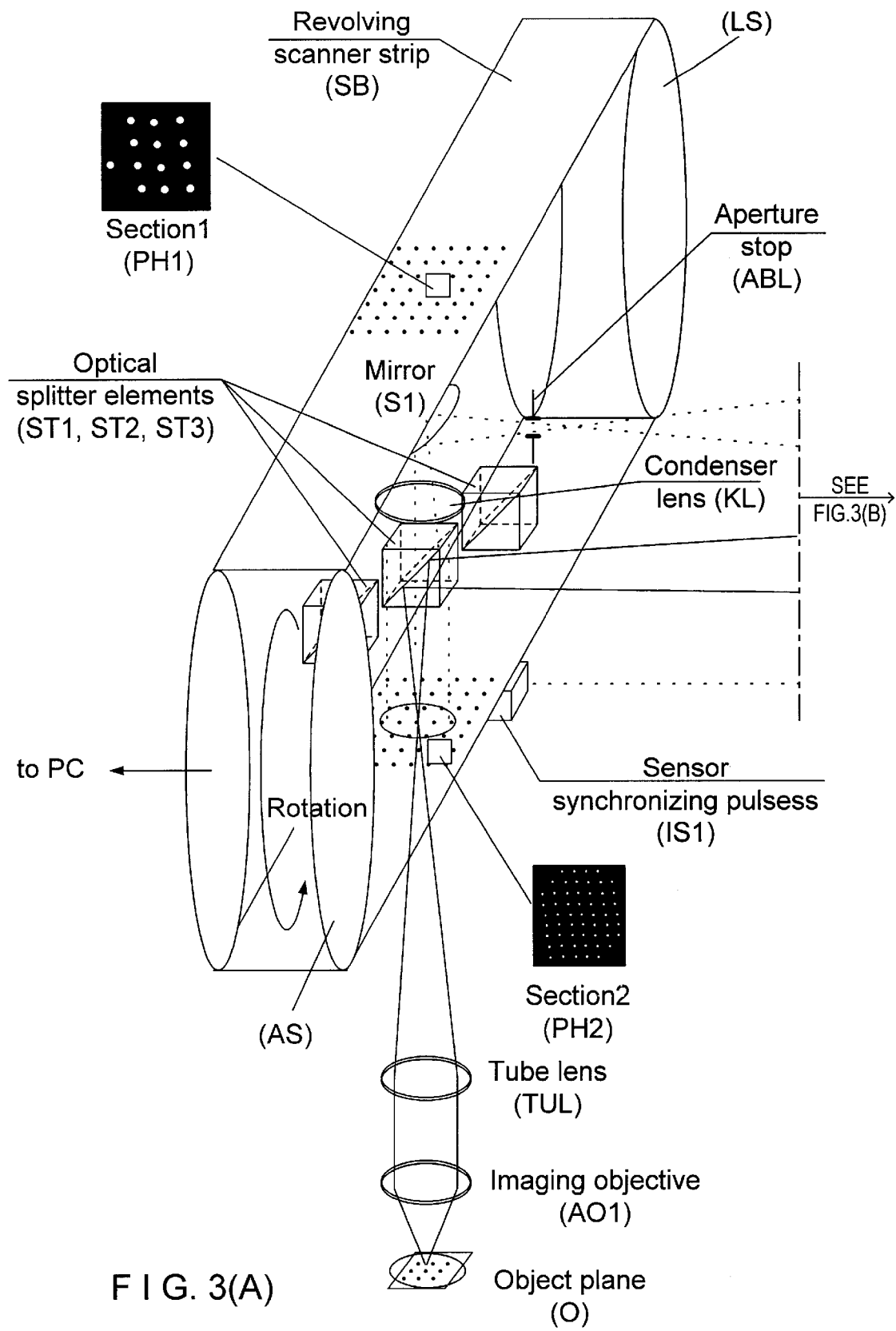
FIGS. 3A and 3B show an arrangement for a parallel confocal image mixing method with a modified strip scanner.
Figure 3B:
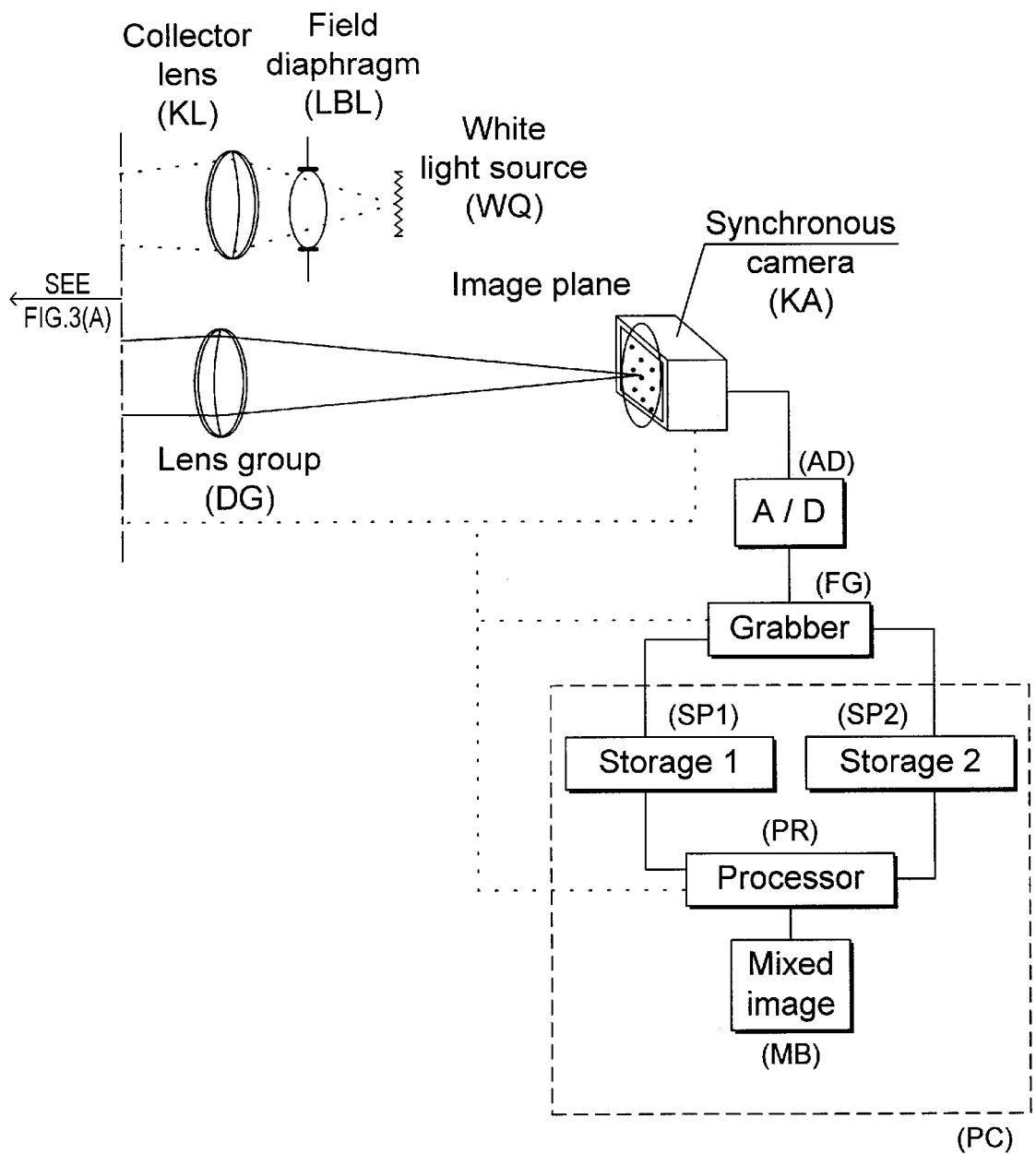
Figure 9A:
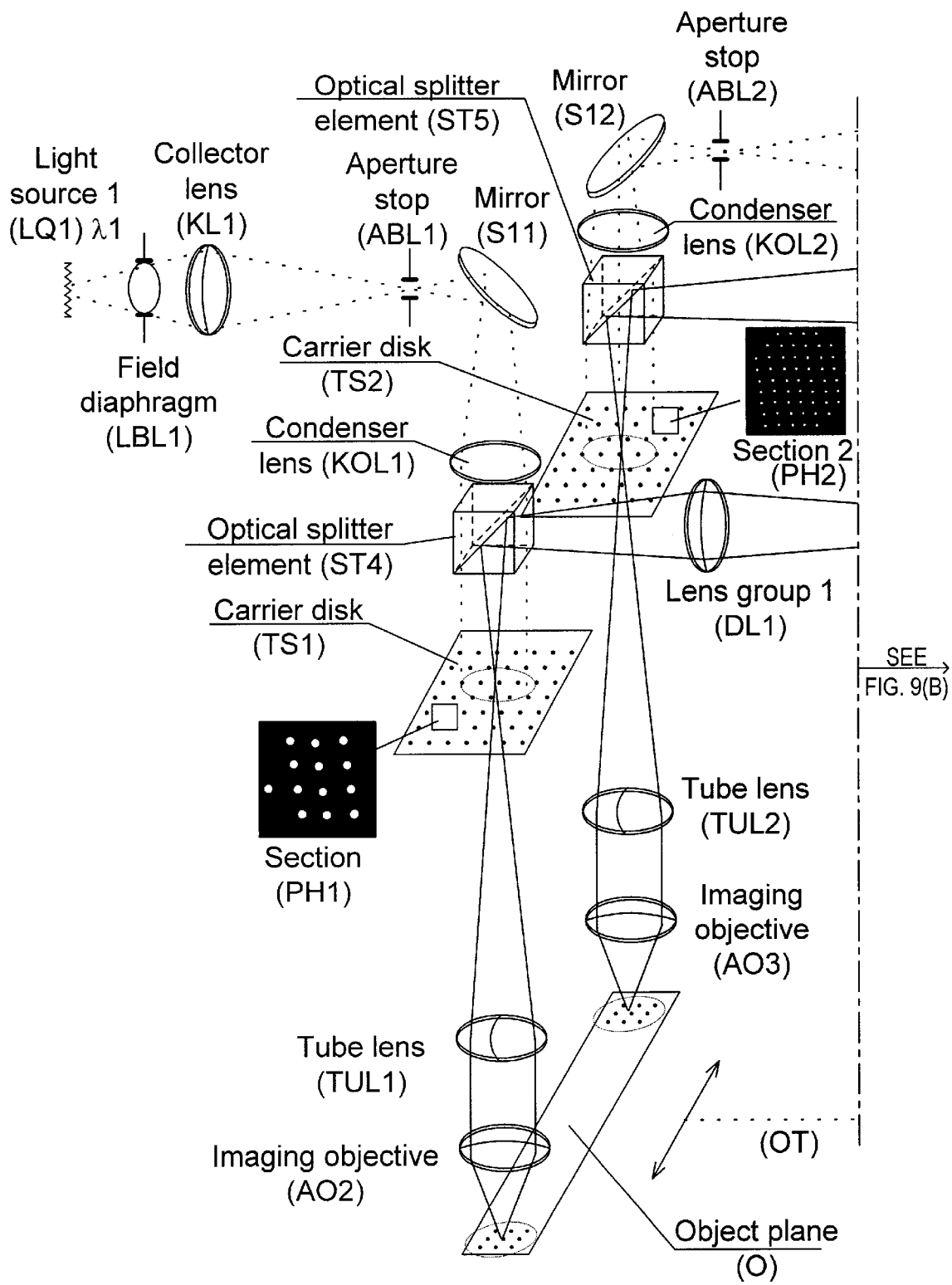
FIGS. 9A and 9B show an arrangement for a parallel confocal image mixing process realized as a construction with two bundles and the linear scanning principle.
Figure 9B:
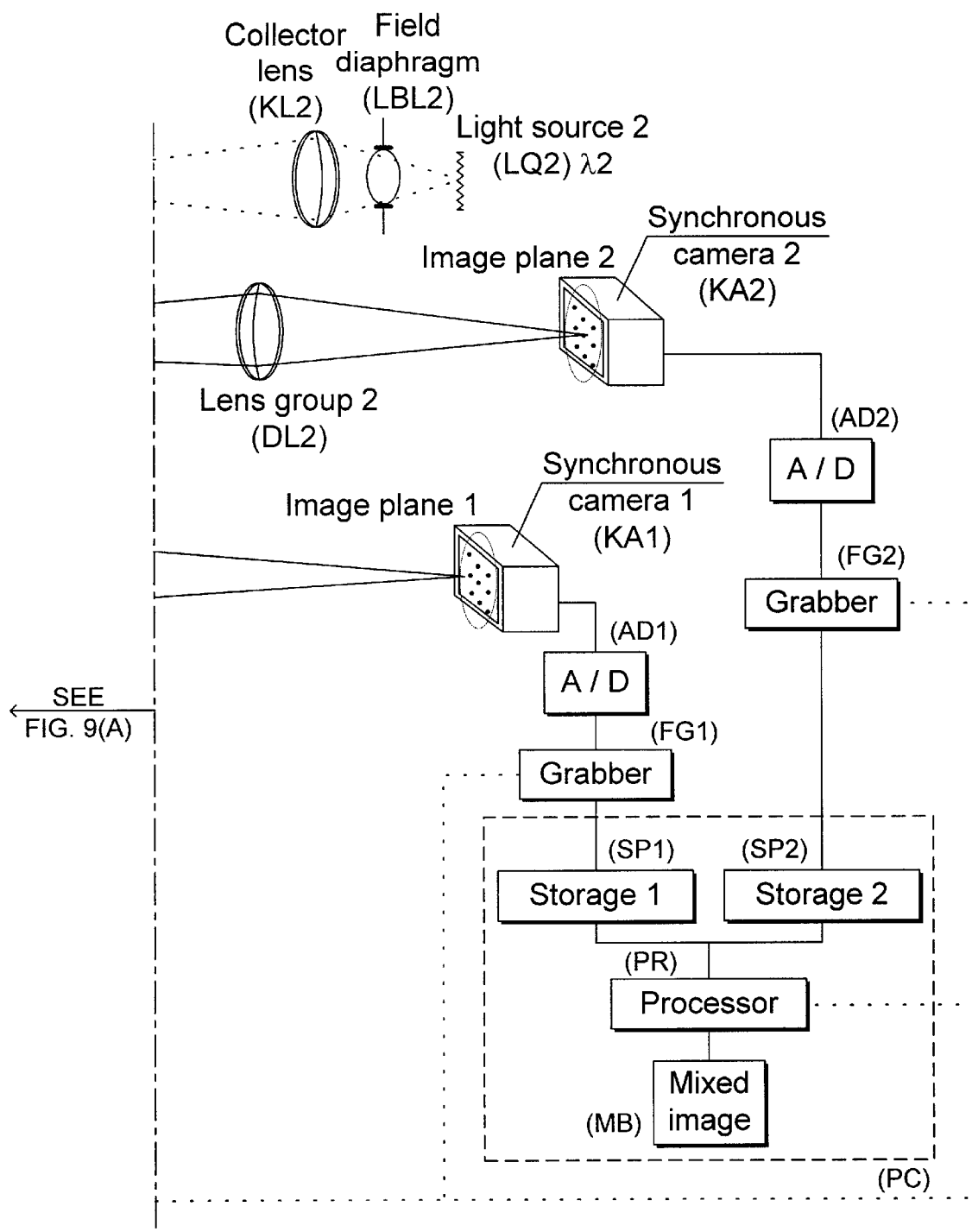

With respect to apparatus, conversion is preferably carried out optically with types of scanners that can generate two different confocal images very quickly. The synchronization with the receiver with respect to time is carried out in two embodiment versions via synchronizing tracks on the Nipkow scanner, as is shown in FIG. 1a, or a strip scanner, as is shown in FIG. 3, or on a filter wheel, as is shown in FIG. 7, which are electrically connected with the receiver via sensors. In a third scanner version, two confocal images are formed at the same time by the use of two cameras, as is shown in FIGS. 9 and 10, wherein the object sections which are currently being scanned differ from one another spatially through the progressive scanning, but at a later point in time have imaged the same object portions. In a particularly advantageous arrangement, temporal and spatial separation of the two confocal images are eliminated, which is shown schematically in FIG. 11. The two confocal images or multiple pairs of confocal images of the object under examination are digitized for further processing and are detected separately in a framegrabbing process in storages. The synchronizing signals supply the distinguishing criterion for the storage of the different images. When at least two images are stored, the combination can be carried out by means of the image processing processor (DSP). The definitive mixed image is then available for visualization (monitor, image printer, image evaluation, or the like).

FIG. 3 shows the arrangement for realizing the image mixing process with a strip scanner. Aside from the reference numbers analogous to FIG. 1, FIG. 3 shows a carrier strip TB with a motor-driven driving disk AS and another running disk LS, wherein AS, LS are articulated so as to be rotatable in a stationary manner, which is not shown. In this case, also, pulse markers IM3 are provided on the strip TB for detecting the strip position. In FIG. 3, the basic optical arrangement is a microscope with a modified strip scanner as confocal element. Again, a conventional light source (continuous or line-source) is used for illumination in order to counter troublesome interference effects or speckle. Köhler illumination, which is well-known, is applied to achieve an advantageously uniform illumination over the field. One or, depending on the application, more exchangeable splitter elements which are intended to divide the illumination beam path from the imaging beam path can be formed as neutral splitters, dichroic splitters or polarizing splitters. The confocal strip, which, as was already mentioned, is provided with different generalized pinhole structures in different strip zones, revolves at right angles to the optical axis at the height of the intermediate image plane in the microscope, wherein some optical elements of the microscope beam path must be orbited by the strip depending on circumstances. In the present case, these elements are the splitters ST1–3, lens KOL and mirror S1. The strip can run over driving rollers or deflecting pulleys and should be able to be regulated with respect to revolving speed so as to be able to adapt to the intensity ratios of different observation objects during the exposure of the receiver. By means of the confocal strip, a confocal image type 1 is formed in pinhole zone PH1 and, after the strip advances, a confocal image type 2 is formed in pinhole zone PH2.

Pinhole elements going beyond the depicted circular pinhole geometry can be structured on the strip as confocal stops. This is shown in FIG. 5.

The two image types are recorded one after the other in time by a surface receiver and distinguishably digitized by an A-D converter arranged downstream. The image types are distinguished by means of the synchronizing pulses IM3 which are arranged on the scanner strip for marking the pinhole zones and which are recorded by an auxiliary sensor as is shown in FIG. 1. They are used for controlling the camera (sensitivity circuit, electronic gating), for the correct choice of image storages for the respective confocal image types, and for the software triggering of the time point of meaningful combination of the storage contents by the image processor to form the mixed image.

Figure 4:
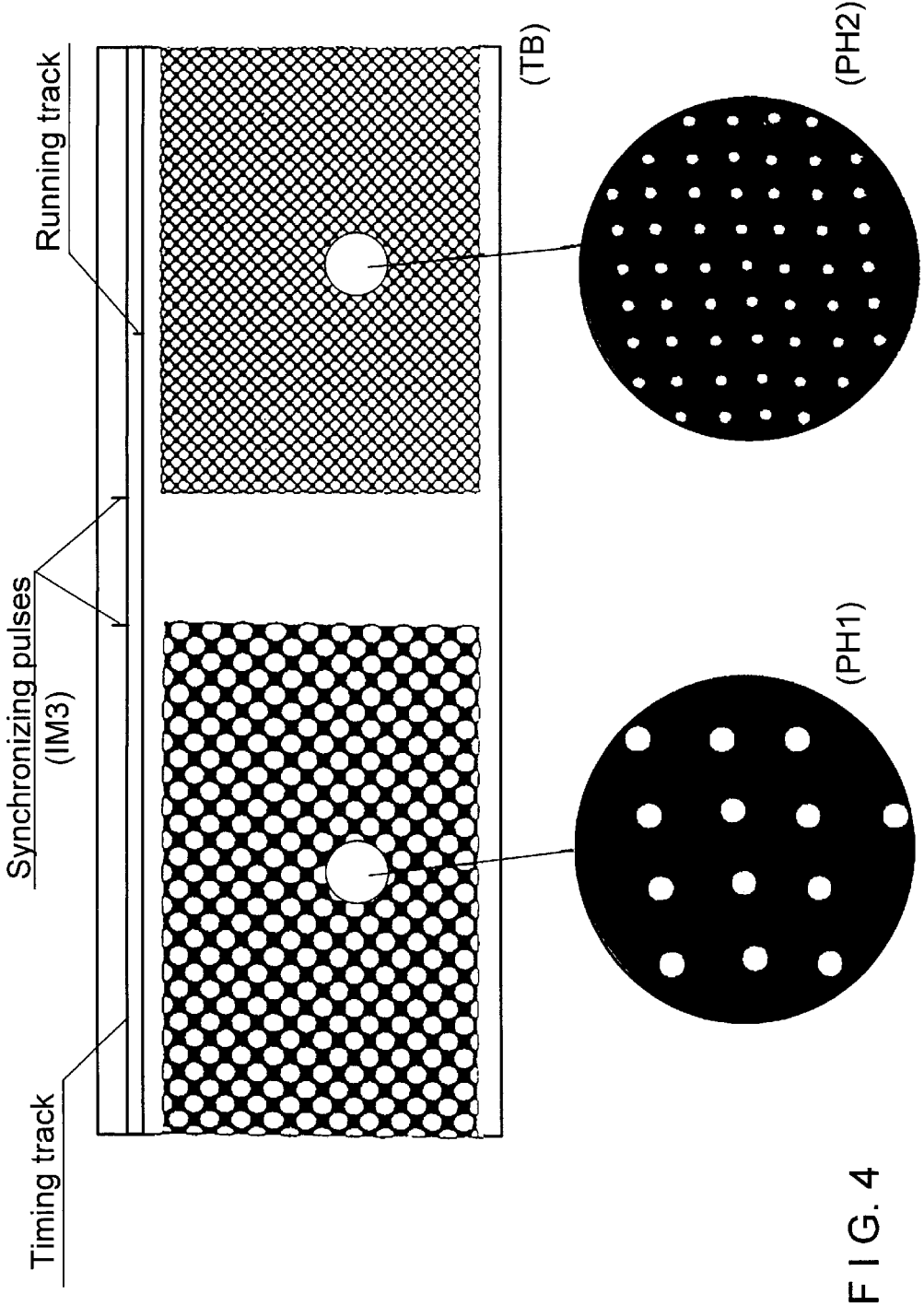
FIG. 4 shows a detail of a modified strip scanner for an image mixing method.

FIG. 4 shows a section of the carrier strip TB with pulse markers IM3 on the timing track TS and portions of the carrier strip TB with pinhole arrangements PH1, PH2. This form of scanner for the image mixing process is based on a revolving pinhole strip. Areas with pinholes or more general pinhole elements such as squares, rhombuses or ring elements such as perforated rings, square rings or the like which have different element dimensions and spacing in various zones of the strip are structured on or in a flexible material, e.g., a thin steel strip, a plastic material or a film strip capable of blackening. These elements could have been shaped and etched, e.g., by a microlithography exposure process, or may have been generated by a photochemical exposure process as a periodic pattern. The different pinhole element zones of the strip recur periodically and are marked by markers outside of the pinhole element zone at the start of the strip and read by an electronic sensor while the strip runs and are used as a synchronizing signal.

The strip is generated as a periodic pattern and, finally, is joined together in a suitable length to form a closed strip (by gluing).

The confocal strip in FIG. 4 comprises two different pinhole zones with a principally rhombic basic arrangement of the pinholes relative to one another in order to accomplish the scan for the entire object surface through the running of the strip. The pinholes of a pinhole zone have the same geometry and spacing relative to one another, wherein coverage with pinhole area should be identical in both pinhole zones. Corresponding to the spacing of the basic rhombic raster, an image is completely scanned after a determined running length of strip; a complete quantity of periodic structures should be present per pinhole zone. This results in a different length of pinhole regions and image building time, but, nevertheless, in the same average exposure intensity for building the two confocal image types. But this has a positive effect on the control of the receiver for the exposure of the two confocal image types.

The arrangement for the pinhole geometry can be right-handed or left-handed, as desired, as is shown in FIG. 5. FIG. 5 shows a basic rhombic arrangement PH11, PH12 running to the left relative to the scanning direction (arrow) in 5a, 5b and a basic rhombic arrangement PH21, PH22 running to the right relative to the scanning direction in 5c, 5d.

FIG. 6 shows examples of pinhole elements in the form of rhombic and circular holes as confocal elements for a strip scanner. FIG. 6 shows two pairs of confocal structures in left-hand basic rhombic arrangements PH13, PH14 with rhombus-shaped pinhole in 6a, 6b and right-hand basic rhombic arrangements PH23, PH24 with a circular pinhole shape in 6c, 6d.

Another advantageous scanner variant with a simple Nipkow disk is shown in FIG. 7. Aside from the elements already mentioned, it shows a motor-driven filter wheel FD with color filters FF1, FF2 for wavelengths $\lambda 1$, $\lambda 2$ and the carrier disk TS with a uniform pinhole pattern PH3. Analogous to Fire 1, a conventional white light source is used as illumination. The splitter element ST is preferably formed as a neutral splitter. The Nipkow disk also rotates at the height of the intermediate image plane in the microscope, but is only structured with one pinhole type. The different confocal images are formed in this arrangement by processing according to the method, already described, as images with different color information of the same observation object. The rate of rotation of the color filter disk used according to the invention should be capable of regulation to be able to adapt to the intensity ratios of different observation objects during the exposure of the receiver. Depending on the actual illumination wavelength, the Nipkow disk causes a confocal image type 1 to be formed or, after switching or further rotation of the color filter disk, a confocal image type 2. By exchanging the filter disk FD, other wavelengths can be used. Distinguishing between the image types is carried out by means of the synchronizing pulses IM4 which are applied to the color filter sectors and recorded by an auxiliary sensor. They are used in turn to control the camera (sensitivity circuit, electronic gating) as well as for the correct choice of image storages for the respective confocal image types and for the software triggering of the time point of meaningful combination of the storage contents by the image processor to form the mixed image.

FIG. 8 shows two examples for pairs of pinhole elements on a modified Nipkow disk in the form of hexagonal pinholes and square ring pinholes as confocal elements arranged in Nipkow-type spiral structures in sections. FIGS. 8a, 8b show a spiral structure with hexagonal pinhole type PH1, PH2 and FIGS. 8c, 8d show a spiral structure with square pinhole type PH1, PH2.

FIG. 9 shows another advantageous arrangement according to the invention with light sources LQ1, LQ2, field diaphragms LBL1, LBL2, collector lenses KL1, KL2, aperture stops ABL1, ABL2, mirrors S11, S12, condenser lenses KOL1, KOL2, beam splitters ST4, ST5, and carrier disk TS1, TS2 which can be component parts of a common carrier disk. Tube lenses TUL1, TUL2 and imaging objectives AO2, AO3 are arranged in the direction of the object O. The object O is displaced in a defined and controllable manner by means of an object translator OT. The following are provided in the direction of detection: optically after-magnifying detection optics DL1, DL2, cameras KA1, KA2, analog-to-digital converters AD1, AD2, framegrabbers FG1, FG2, storages SP1, SP2, and a processor PR for generating the mixed image MB.

This third basic version of a scanner for the image mixing process is a linear scanner with rhombic arrangement of the confocal elements relative to one another and can be used in a mono-bundle or dual-bundle arrangement. Two zones which are suitably offset spatially relative to one another are located on the stationary disk with the confocal elements (pinhole elements), these two zones having pinhole elements (right-angled) with a basic rhombic pattern of pinhole elements relative to one another and different sizes of pinhole elements and average spacing in the respective pinhole zone. The pinhole elements in the different zones and the correct position of the regions relative to one another are designed and structured very exactly relative to one another, e.g., by a microlithographic production process. With the linear scanning principle, a section of the object under observation is scanned in a parallel confocal manner and its (line) image is completely generated through uniform displacement of the observation object—relatively similar to the scanning action in the strip scanner by circulation of the strip—within a displacement path depending on the basic rhombic structure. However, the confocal image can advantageously be electronically evaluated efficiently only by means of a special camera (TDI camera) which unifies the "confocal point pattern image" by means of its operating principle of synchronous transverse displacement of the photoelectronically generated charges between the parallelized lines (stages) to form a closed line image. Finally, the line image is read out very quickly and continuously, so that a stripe-shaped image format of the observation object is formed during the movement of the latter.

The linear scanner suggested above can be applied in an optical basic arrangement similar to a microscope (automatic inspection machine). In this case, the light sources can be two conventional lamps (preferably short-arc lamps) or two different lasers which, in sub-variants of the arrangement, can be operated with different wavelengths or with the same wavelengths. Two splitter elements (also exchangeable by pairs) which are intended to divide the illumination beam path from the imaging beam path are formed either as neutral splitters, dichroic splitters or as polarizing splitters.

The object under observation (primarily wafers in the structuring process) is moved uniformly at right angles to the optical axis of the optical arrangement, so that the parallel confocal image scan is carried out at the height of the intermediate image plane of the device by means of the basic rhombic pattern of the pinhole elements relative to one another. The speed of displacement of the object under observation should be capable of regulation in order to be able to adapt to the sensitivity (exposure, light density source) as well as to the readout speed of the receivers (TDI line cameras). The linear scanner causes a confocal image type 1 (with elongated image format) to be formed in pinhole zone 1 or a confocal image type 2 (likewise with elongated image format) to be formed in a spatially offset manner in pinhole zone 2. Every image is recorded simultaneously—in this instance in an optically parallel manner, but so as to be slightly offset spatially—by the associated receiver and is digitized by an A-D converter arranged downstream. The receivers should advantageously be TDI (Time Delayed Integration) line cameras which have extremely high readout rates and accordingly permit an efficient, continuous object movement and therefore achieve the highest testing productivity currently attainable. The distinguishing of the image types (storage) is obviously simple in this third basic version of the scanner. The exactly known spatial separation of the two image bundles and the object speed enable the correlation of identical object structures (in a pixel-exact manner) in the images and the electronic representatives thereof in the storages for the image mixing. The meaningful combination of storage contents by the image processor for the mixed image can accordingly be carried out when digital image components of the respective identical object section are present. Determination of the exactly identical image section is carried out by means of the known displacement speed and constant spacing of the pinhole zones.

FIG. 10 shows another advantageous variant of the linear scanner which is simpler to adjust and more stable and which uses only one optical imaging system, but two confocal bundles. In this case, the bundles are moved close together, for example, by means of narrower beam splitters. Apart from the elements already mentioned, FIG. 10 shows a tube lens TUL3 common to both beam paths, a common imaging objective AO4 and optically after-magnifying detection optics DL3.

In this arrangement, only one imaging optical system is used, which is only possible with suitably corrected large optical work fields of the transmission system.

The decisive advantage in this case is the more compact construction and the small distance between the optical confocal work fields, which makes the arrangement faster and less sensitive to disturbances (vibrations or the like) and considerably simpler to adjust. The illumination is carried out in the first arrangement with two conventional lamps (preferably short-arc lamps) or two different lasers.

In contrast to nonconfocal, conventional incident illumination, the special nature of the confocal illumination principle and imaging principle in the method and arrangements according to the invention permits the use of lasers as a light source. In conventional incident illumination (no fluorescence application) in microscopy, the use of lasers is prohibited in general (apart from micro-interferometric arrangements, e.g., DE 19632594 A1) because the coherent secondary effects of the laser (speckle, disturbances caused by interfering reflections) are very strongly superimposed on the image during imaging, critically interfering with the latter. With confocal image generation, the situation is changed with regard to image formation at the object site: the confocal diffraction-limited "microprobe" has no interaction with other points of the observation object while the image is being built, but only with the object point currently being scanned. This means that the successively occurring image points of the object region are completely incoherent relative to one another. This results in an incoherent character of the optical raster image and total digital image. The statistically occurring spatial-temporal coherence cells which manifest themselves as speckle in the laser bundle and which give the phenomenological, characteristic granulation in the laser beam cross section are eliminated or reduced by the likewise spatially-temporally acting averaging by means of scanning over the beam cross section of the illuminating laser and accordingly prevent the granularity in the image points which falsifies intensity. A further advantage of the confocal image construction is the sharp reduction in the influence of secondary reflections of the lens surfaces of the imaging optical system due to the confocal stops in the image plane which allow only a fraction of the interference-susceptible false light to penetrate into the secondary image space (reflection images occur, among others, remote of the image plane in correctly designed systems) and reduce their contrast-damaging effect in the image.

An advantage of the linear scanning principle in the suggested case of application is that different mixing principles can be applied: the confocality can be adjusted not only by changing the pinhole size, but also, e.g., by selecting different illumination wavelengths in the two channels or by selecting different apertures in the imaging channels. This results in advantageous combinations and additional qualitative advantages for conversion of the image mixing process.

Figure 11A:
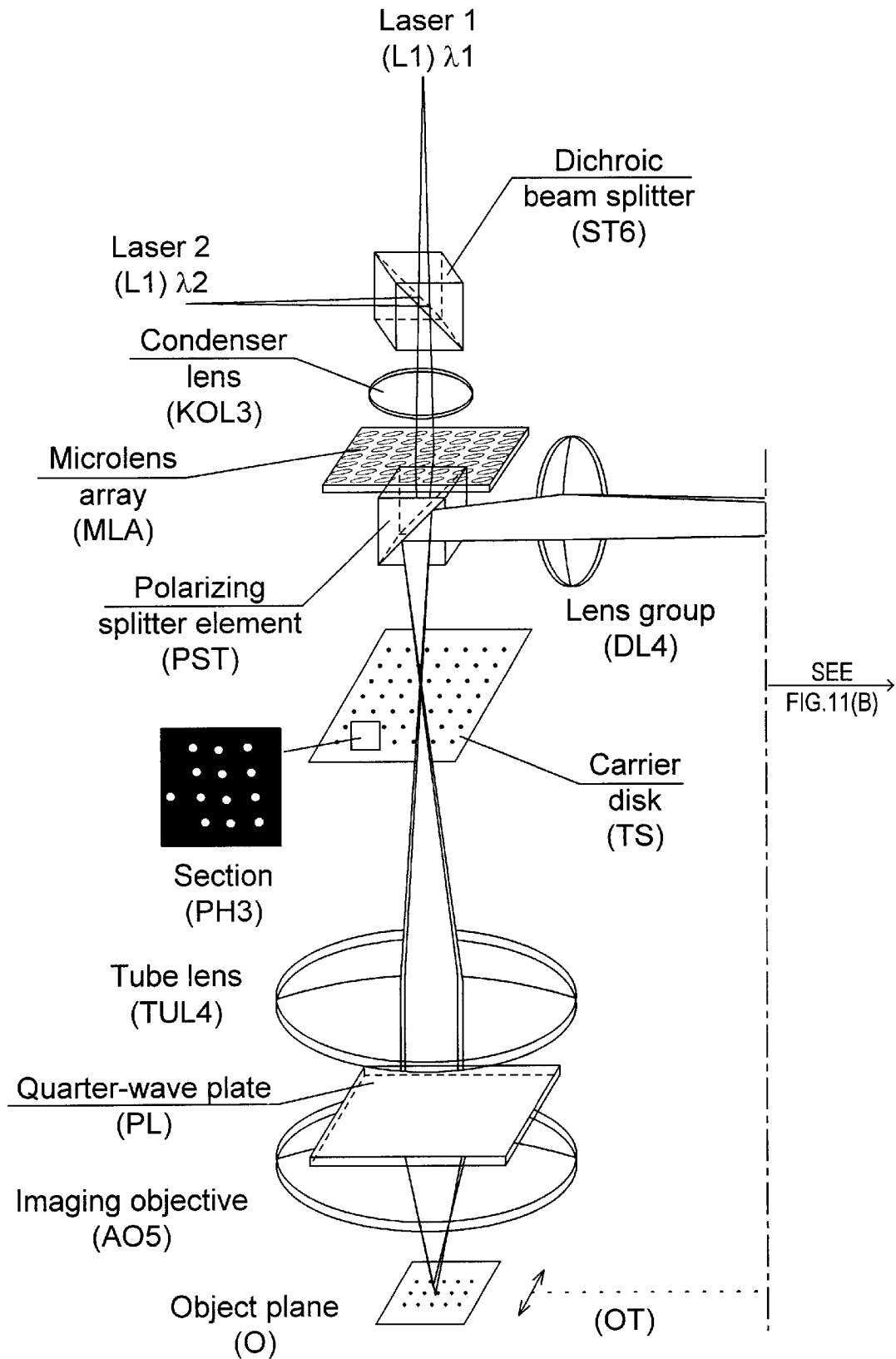

FIG. 11 shows an arrangement with two lasers for illumination and two TDI cameras in the linear scanning principle. Laser L1 with wavelength $\lambda 1$ and laser L2 with wavelength $\lambda 2$ are focused pointwise via beam splitter ST6 and condenser lens KOL3 and a microlens array MLA in the direction of a pinhole array PH3. The illumination of the object is carried out via tube lens TUL4, a quarter-wave plate PL and the imaging objective AO5. A polarizing beam splitter PST is arranged between the pinhole arrangement PH3 and microlens array MLA for masking in the direction of optically after-magnifying detection optics DL4 and a dichroic beam splitter ST7 for dividing up the detection light in a wavelength-selective manner in the direction of cameras KA1, KA2, followed by elements that have already been described.

This advantageous version of an automatic inspection device according to the image mixing process with two different colored lasers for illumination means that the advantage of the laser—unsurpassed spectral luminous density—is made use of for an optimal exposure process of the TDI camera without being directly subjected to the decisive disadvantage of the laser light sources—contrast-degrading action due to the great capacity for interference of the lasers in optical imaging.

With laser illumination, the illumination efficiency in parallel confocal arrangements can be enormously improved by a microlens array (conjugated to rhombic pinhole array). In the suggested version, the special array MLA for the image mixing process must be color-corrected with different working wavelengths and one pinhole type for the two laser lines and is advantageously illuminated in parallel by the condenser.

A secondary condition which must be met consists in that the focal length and diameter of the microlenses must correspond to the required image-side apertures of the optical main system and must be exactly centered with respect to the pinhole array, so that a "critical illumination", as it is called, of the pinhole elements is generated. Thorough coupling (mixing together) of the two lasers in the illumination beam path is carried out by means of a dichroic mirror ST6. The separation (de-mixing) of the different colored laser images in the imaging beam path is likewise carried out by means of a dichroic mirror ST7. The separation of the illumination beam path and imaging beam path is advantageously carried out by means of a polarizing-optical splitter mirror PST in combination with a broad-band quarter-wave plate for the laser lines.

Other mixing variants beyond the multiple-channel arrangements depicted are possible: these are, e.g., different polarizing-optical characteristics of the two transmission channels which can be utilized for mixing. Depending on the peculiarities of the objects under observation, these different varieties can be applied to cover up or render visible new object characteristics.

Further, the invention can advantageously be applied to laser scanning microscopes such as the Zeiss LSM4 or 5 and was tested for the latter in that a plurality of confocal reflection images of the same object portion were recorded and processed as described above.

While the foregoing description and drawings represent the present invention, it will be obvious to those skilled in the art that various changes may be made therein without departing from the true spirit and scope of the present invention.

LIST OF REFERENCE NUMBERS

Figure 8C:
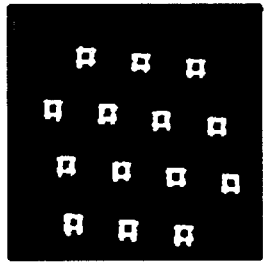
FIG. 8 shows examples for other generalized pinhole types.
Figure 8D:
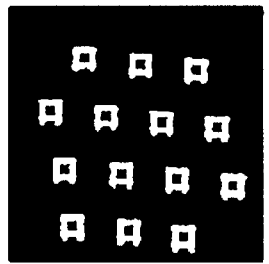
Figure 8A:
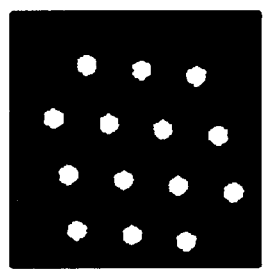
Figure 8B:
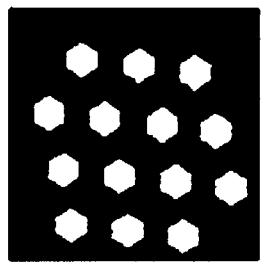

FIG. 1a
white light source WQ
field diaphragm LBL
collector lens KL
aperture stop ABL
mirror S1
condenser lens KOL
exchangeable dichroic beam splitters ST1, ST2, ST3
carrier disk TS
pinhole arrays PH1, PH2
pulse sensor IS
pulse markers IM1, IM2
tube lens TUL
imaging objective AO1
object O in object plane
detector optics DL
camera KA
analog-to-digital converter AD
framegrabber FG
storages SP1, SP2
processor PR
computer PC
mixed image MB
FIG. 1b
carrier disk TS with pulse markers IM on a timing track TKS
pinhole zones PH1, PH2
black zones SZ1, SZ2
centering circle ZK
FIG. 2
image pixel matrix BM1, BM2
mixed image matrix MBM
FIG. 3
reference numbers analogous to FIG. 1
carrier strip TB
motor-driven driving disk AS
running disk LS
AS, LS articulated in stationary manner, not shown
pulse markers IM3
FIG. 4
section of carrier strip TB
pulse markers IM3 on timing track TS
portions of carrier strip TB with pinhole arrangements PH1, PH2
FIG. 5
5a, 5b basic rhombic arrangement PH11, PH12 running toward left-hand side relative to scanning direction
5c, 5d basic rhombic arrangement PH21, PH22 running toward right-hand side relative to scanning direction
FIG. 6
6a, 6b: left-hand basic rhombic arrangements PH13, PH14 with rhombic pinhole shape
6c, 6d: right-hand basic rhombic arrangements PH23, PH24 with circular pinhole shape
FIG. 7
aside from elements already mentioned,
motor-driven filter wheel FD with color filters FF1, FF2 for wavelengths $\lambda 1$, $\lambda 2$ carrier disk ts with a pinhole pattern PH3
FIG. 8
FIGS. 8a, 8c: spiral structure with hexagonal pinhole type PH1, PH2
FIGS. 8b, 8d: spiral structure with four-sided pinhole type PH1, PH2
FIG. 9
light sources LQ1, LQ2
field diaphragms LBL1, LBL2
collector lenses KL1, KL2
aperture stops ABL1, ABL2
mirrors S11, S12
condenser lenses KOL1, KOL2
beam splitters ST4, ST5
carrier disks TS1, TS2
tube lenses TUL1, TUL2
imaging objectives AO2, AO3
object translator OT
detection optics DL1, DL2
cameras KA1, KA2
analog-to-digital converters AD1, AD2
framegrabbers FG1, FG2
storages SP1, SP2 processor PR
mixed image MB
FIG. 10
Apart from elements that have already been mentioned,
tube lens TUL3 common to both beam paths
imaging objective AO4
detection optics DL3
FIG. 11
laser L1 with wavelength λ1
laser L2 with wavelength λ2
beam splitter ST6
condenser lens KOL3
microlens array MLA
polarizing beam splitter PST
pinhole array PH3
tube lens TUL4
quarter-wave plate PL
imaging objective AO5
detection optics DL4
dichroic beam splitter ST7
cameras KA1, KA2 with subsequent elements already described

What is claimed is:

1. An arrangement for generating object images in a microscope, comprising:
   means for recording at least two reflected confocal images of an object with distinguishable optical object information with respect to image pixels and for storing them one after the other; and
   means for combining the recorded and digitized images in a pixel-exact manner and for storing a mixed image formed in this way;
   wherein a parallel confocal generation of raster images of the object is carried out via different pinhole arrangements so that each initial image of the object has a different confocal resolution.

2. The arrangement according to claim 1, wherein the mixed image is displayed on a picture screen or processed by image processing apparatus.

3. The arrangement according to claim 1, including means for generating parallel confocal incident illumination bundles in or on the object.

4. The arrangement according to claim 1, wherein different pinhole arrangements are used one after the other with respect to time for image generation.

5. The arrangement according to claim 1, wherein pinhole arrangements are displaced for confocal scanning of the object.

6. The arrangement according to claim 1, wherein the object itself is displaced for confocai scanning of the object.

7. The arrangement according to claim 1, wherein, in the case of a moving object, different and stationary pinhole arrangements are used for image recording of the same object area.

8. The arrangement according to claim 1, with pinhole arrangements arranged on a revolving strip.

9. The arrangement according to claim 1, with different pinhole arrangements arranged on a rotating disk.

10. The arrangement according to claim 1, with a white light source for object illumination.

11. The arrangement according to claim 1, comprising a light source, illumination optics, pinhole arrangement, imaging optics, object, wherein the light coming from the illuminated object is directed via the pinhole arrangement and a beam splitter in the direction of optically after-magnifying detection optics which are arranged following the image processing means.

12. The arrangement according to claim 1, wherein means are provided for correlating the recorded images with recording conditions.

13. The arrangement according to claim 1, wherein synchronizing markers and sensors for detection thereof are provided.

14. The arrangement according to claim 1, wherein the object is illuminated successively with different wavelengths.

15. The arrangement according to claim 1, wherein illumination is carried out via the same or different pinhole arrangements.

16. The arrangement according to claim 1, wherein at least one CCD camera is used for image recording.

17. The arrangement according to claim 1, wherein at least one TDI camera is used for image recording.

18. The arrangement according to claim 1, wherein lasers of different wavelengths are provided for illumination.

19. The arrangement according to claim 1, wherein the image recording is carried out by a laser scanning microscope.

20. The arrangement according to claim 1, wherein detection and image recording are carried out successively with different detection wavelengths.

21. The arrangement according to claim 1, wherein a recording is carried out with different apertures of the illumination system.

22. The arrangement according to claim 1, wherein light sources are conventional, noncoherent light sources of different wavelengths and predetermined bandwidth.

23. The arrangement according to claim 1, wherein conventional light sources are high-power arc lamps.

24. The arrangement according to claim 1, wherein wavelengths for illumination are extracted from a light source through suitable filers.

25. The arrangement according to claim 1, wherein a selection of wavelengths is carried out by quickly changeable color filers in a form of switching filters or rotating sectored filter wheels.

26. The arrangement according to claim 1, wherein light sources are laser light sources with different wavelengths.

27. The arrangement according to claim 1, in which a spatially parallel or temporally offset imaging of a light source in an object plane of an optical observation device is realized by rhombus-shaped arrays or different, suitably arranged Nipkow type spiral patterns of pinhole elements.

28. The arrangement according to claim 1, in which structures of pinhole elements have a shape of a right-hand oriented or a left-hand oriented rhombic basic array and are used in a stationary manner in case of a moving object or are constructed on a flexible revolving strip.

29. The arrangement according to claim 1, in which parallel confocal scanning of the object plane in pairs is achieved by the displacement of the observation object in combination with a right-hand oriented or a left-hand oriented stationary rhombic basic array.

30. The arrangement according to claim 1, in which either pinhole arrays for illumination are likewise used functionally for confocal image generation or, otherwise, the surface receivers have, in addition, a sensitivity structure which generates confocal characteristics in the image space.

31. The arrangement according to claim 1, in which confocal characteristics of the surface receiver are achieved by masking diaphragms on a receiver, by surface elements of the receiver which are produced so as to be correspondingly sensitized, by an electronic sensitizing circuit or by a software selection control at the receiver or reception signal.

32. The arrangement according to claim 1, in which neutral, polarization-dependent or dichroically-splitting elements, chiefly in the form of an optical cube or a rhomboid base body, are used to divide illumination and imaging bundles.

33. The arrangement according to claim 1, in which polarizing-optical splitters combined with quarter-wave plates are used in main beam paths to achieve a good splitting of illumination and imaging.

34. The arrangement according to claim 1, in which imaging elements have a high degree of optical correction for eliminating imaging errors, are outfitted in some components with zoom-optical characteristics, and an optical after-magnification is provided in a detection beam path.

35. The arrangement according to claim 1, in which imaging elements are produced without optical stresses and two confocal images of an observation object are generated in two polarization states and mixed by selective polarizing-optical parallel and vertical illumination.

36. The arrangement according to claim 1, in which imaging elements have an adjustable transmission aperture, or in a case of dual-bundle arrangements, different transmission apertures, with same magnification in order to generate and subsequently mix two confocal images of same observation object for two different transmission apertures.

37. The arrangement according to claim 1, in which pinhole elements have a circular, square or rhombic basic shape or, alternatively, have an annular shape of the respective basic figure.

38. The arrangement according to claim 37, in which a right-hand-oriented or a left-hand oriented rhombic basic array on a flexible strip is used, by its revolution, for confocal scanning of an object plane.

39. An arrangement for generating object images in a microscope, comprising:
   means for recording at least two reflected confocal images of a same object with distinguishable optical object information with respect to image pixels and for storing them one after the other; and
   means for combining the recorded and digitized images in a pixel-exact manner, through subtraction;
   wherein a parallel confocal generation of raster images of the object is carried out via different pinhole arrangements so that each initial image of the object has a different confocal resolution.

40. A method for generating object images in a microscope, comprising the steps of:
   recording at least two reflected confocal images of an object with distinguishable optical object information with respect to image pixels and storing them one after the other; and
   combining the recorded and digitized images in a pixel-exact manner and the mixed image formed in this way is stored;
   wherein a parallel confocal generation of raster images of the object is carried out via different pinhole arrangements so that each initial image of the object has a different confocal resolution.

41. The method according to claim 40, in which electronic representatives of the different optical confocal images are generated by digitization of a receiver signal.

42. The method according to claim 40, in which different digitized confocal images are stored distinguishably in storages, which is controlled by synchronizing signals and an auxiliary sensor or is carried out by natural correlation of digitized confocal images with respect to two receivers.

43. The method according to claim 40, wherein different digitized, distinguishably stored confocal images are combined to form a mixed image by fast image processors.

44. The method according to claim 40, wherein an image recording isynchronized by marker signals via an auxiliary sensor.

45. The method according to claim 40, characterized by subtraction operations $\Delta(P_{i''j''})$ with elements $P_{ij}$ and $P_{i'j'}$ of measured confocal image matrices to form resultant elements $P_{i''j''}$ of the image matrix in the mixed image.

46. A method for generating object images in a microscope, comprising the steps of:
   recording at least two reflected confocal images of a same object with distinguishable optical object information with respect to image pixels and storing them one after the other; and
   combining the recorded and digitized images in a pixel-exact manner, through subtraction;
   wherein a parallel confocal generation of raster images of the object is carried out via different pinhole arrangements so that each initial image of the object has a different confocal resolution.

* * * * *